(12) United States Patent
Peterson et al.

(10) Patent No.: US 11,851,098 B2
(45) Date of Patent: Dec. 26, 2023

(54) VEHICLE BATTERY SERVICE CART WITH CONFIGURABLE FRAME

(71) Applicant: Robert Bosch GmbH, Stuttgart (DE)

(72) Inventors: Corday Peterson, Fountain, MN (US); Joseph Lee, Minneapolis, MN (US)

(73) Assignees: Bosch Automotive Service Solutions Inc., Warren, MI (US); Robert Bosch GmbH, Stuttgart (DE)

( * ) Notice: Subject to any disclaimer, the term of this patent is extended or adjusted under 35 U.S.C. 154(b) by 69 days.

(21) Appl. No.: 17/493,404

(22) Filed: Oct. 4, 2021

(65) Prior Publication Data
US 2022/0135100 A1 May 5, 2022

Related U.S. Application Data

(60) Provisional application No. 63/106,953, filed on Oct. 29, 2020.

(51) Int. Cl.
*B62B 3/10* (2006.01)
*B62B 3/02* (2006.01)
(Continued)

(52) U.S. Cl.
CPC ............... *B62B 3/10* (2013.01); *B62B 3/02* (2013.01); *B62B 5/0079* (2013.01); *B62B 5/0442* (2013.01); *B62B 5/06* (2013.01)

(58) Field of Classification Search
CPC ........... B62B 3/10; B62B 3/02; B62B 5/0079; B62B 5/0442; B62B 5/06; B62B 2202/61;
(Continued)

(56) References Cited

U.S. PATENT DOCUMENTS 2,729,196 A * 1/1956 Breitenbach ............. B62B 3/02
119/512
4,674,726 A * 6/1987 Roux ...................... B66F 7/00
254/7 R
(Continued)

FOREIGN PATENT DOCUMENTS

CN 108381270 A * 8/2018 ............... B23Q 7/00
CN 108670588 A * 10/2018 ............... A61G 1/02
(Continued)

OTHER PUBLICATIONS

Translated copy of CN-108381270-A (Year: 2023).*
Translated copy of DE-202018005141-U1 (Year: 2023).*

*Primary Examiner* — James A Shriver, II
*Assistant Examiner* — Ian Bryce Shelton
(74) *Attorney, Agent, or Firm* — David Kovacek; Maginot, Moore & Beck LLP

(57) ABSTRACT

A service cart and associated apparatus that is suitable for servicing electric vehicles and vehicle batteries. The service cart may comprise a frame having a number of members that may be arranged in a compact configuration. The service cart may comprise a number of support pads that may be adjustably arranged with respect to the frame. The support pads may comprise an overload protection mechanism having a break pin. The service cart may comprise a detachable handle operable to selectively disengage a number of brakes on the cart. The service cart may comprise a tow hitch suitable for detachably coupling an external tow device.

18 Claims, 18 Drawing Sheets

(51) Int. Cl.
  *B62B 5/06* (2006.01)
  *B62B 5/04* (2006.01)
  *B62B 5/00* (2006.01)

(58) Field of Classification Search
  CPC . B62B 5/0485; B62B 2301/05; B62B 5/0447; B62B 5/067; B62B 3/005; B62B 5/00; B62B 5/0457; B62B 3/002; B62D 65/022; B62D 65/10
  See application file for complete search history.

(56) References Cited

U.S. PATENT DOCUMENTS

| | | | | |
|---|---|---|---|---|
| 4,934,720 | A * | 6/1990 | Dobron | B62B 5/0083 108/56.1 |
| 4,984,814 | A * | 1/1991 | Graffunder | B62B 5/0003 280/35 |
| 5,599,031 | A * | 2/1997 | Hodges | B62B 5/0083 280/35 |
| 5,738,365 | A * | 4/1998 | McCarthy | B62B 3/022 280/651 |
| 6,619,620 | B1 * | 9/2003 | Carter | B66F 7/0625 254/10 C |
| 6,663,139 | B1 * | 12/2003 | Smith | B62B 3/025 280/651 |
| 7,097,182 | B1 * | 8/2006 | Liu | B62B 3/02 280/42 |
| 8,651,501 | B1 * | 2/2014 | Davis | B62B 5/0086 254/133 R |
| 10,232,761 | B2 * | 3/2019 | Hooper | B62B 3/04 |
| 10,743,680 | B1 * | 8/2020 | Weis | A47F 5/14 |
| 10,933,693 | B2 * | 3/2021 | Wells | B60B 33/0023 |
| 2001/0054806 | A1 * | 12/2001 | Calender | B62B 5/0083 280/47.131 |
| 2008/0087792 | A1 * | 4/2008 | Evitt | F16M 3/00 248/676 |
| 2012/0110816 | A1 * | 5/2012 | Groves | F01D 25/285 254/7 C |
| 2021/0253189 | A1 * | 8/2021 | Miller | B62B 3/10 |
| 2021/0276603 | A1 * | 9/2021 | Knepp | B62B 5/04 |
| 2021/0354741 | A1 * | 11/2021 | Maples | B62B 3/022 |
| 2021/0380154 | A1 * | 12/2021 | Palumbo, Jr. | A61G 21/00 |

FOREIGN PATENT DOCUMENTS

| | | | | |
|---|---|---|---|---|
| CN | 109484369 | A * | 3/2019 | B60L 53/80 |
| CN | 109606439 | A * | 4/2019 | B62B 3/02 |
| CN | 110182381 | A * | 8/2019 | |
| CN | 110510544 | A * | 11/2019 | |
| CN | 111619630 | A * | 9/2020 | |
| CN | 111791934 | A * | 10/2020 | |
| DE | 202013000849 | U1 * | 4/2013 | B62B 5/0414 |
| DE | 202014100810 | U1 * | 4/2014 | B62B 3/02 |
| DE | 202018005141 | U1 * | 1/2019 | |
| DE | 102019008650 | A1 * | 8/2020 | |
| DE | 202020002694 | U1 * | 10/2020 | B62B 3/02 |
| KR | 20110066309 | A * | 6/2011 | |
| KR | 101338165 | B1 * | 12/2013 | |
| KR | 20160107811 | A * | 9/2016 | |
| KR | 20200012357 | A * | 2/2020 | |
| WO | WO-2019085325 | A1 * | 5/2019 | B60L 53/80 |

* cited by examiner

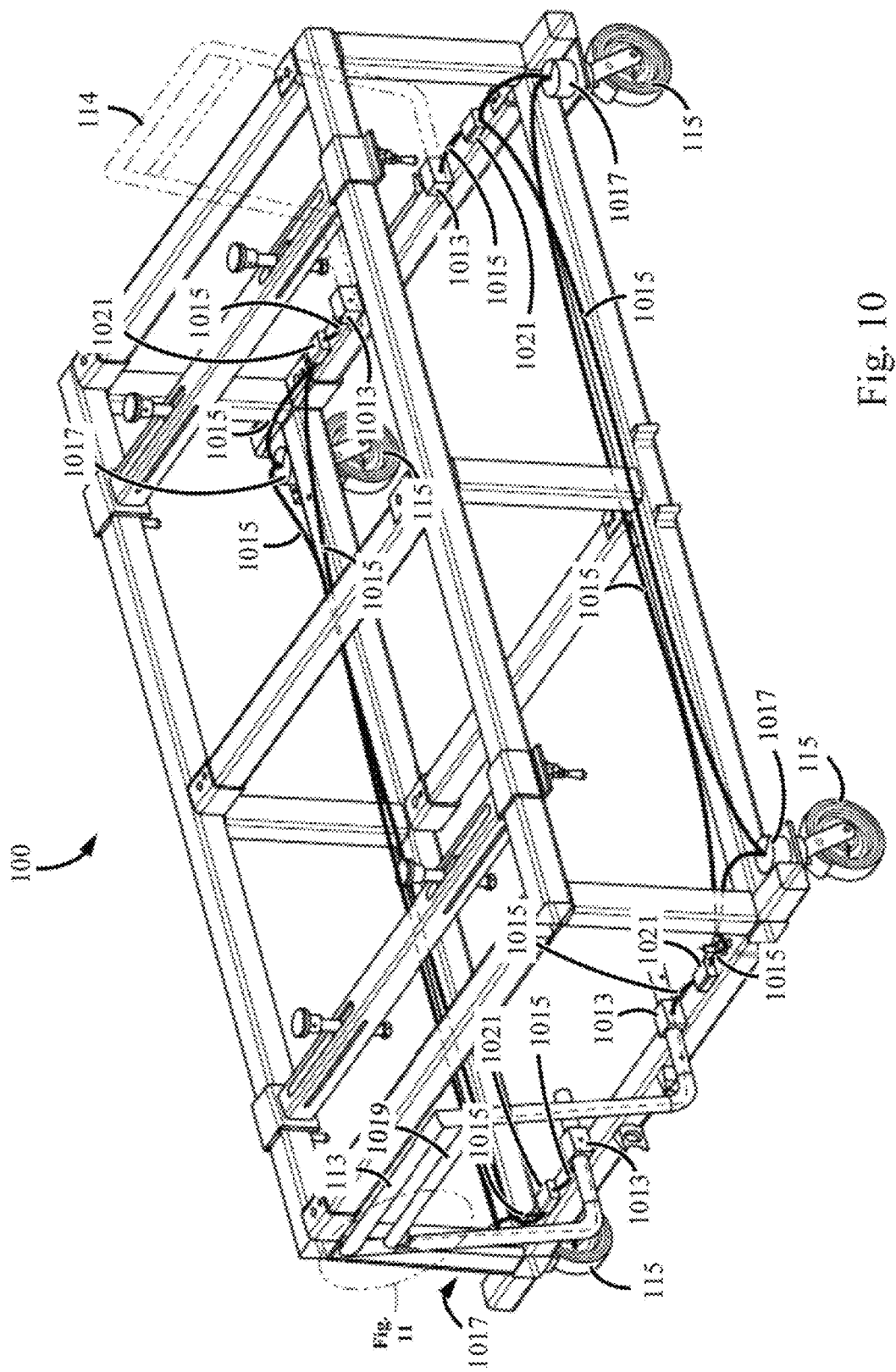

VEHICLE BATTERY SERVICE CART WITH CONFIGURABLE FRAME

TECHNICAL FIELD

This disclosure relates to the repair and maintenance of electric vehicles and their associated batteries. More specifically, this disclosure relates to tools useful in the repair and maintenance of electrical vehicles and their associated batteries.

BACKGROUND

Electric vehicles are becoming more popular as their versatility and reliability improves. Electric vehicles and their respective components still require servicing for repair and maintenance operations. Most electric vehicles feature a large, heavy battery suitable to drive the prime mover of the vehicle, which often must be removed from the chassis of the vehicle to perform certain important servicing to the vehicle or to the battery itself.

Because of their size and weight, removal of the batteries from their respective chassis is often difficult and time-consuming, and may require specialized tools in a specialized shop environment. Such tools are often expensive, cumbersome, and difficult to store.

SUMMARY

One aspect of this disclosure is directed to a service cart suitable for servicing electric vehicles and vehicle batteries. The service cart may have a frame comprising a number of first brace members, a number of second brace members, a number of support members, a number of first cross members and a number of second cross members. Each of the support members are disposed between a first brace member and a second brace member, each of the first cross members are disposed between ones of the number of first brace members, and each of the second cross members are disposed between ones of the number of second brace members. The service cart may further comprise a first number of wheels, each of the wheels operably coupled to at least one of the first brace members or one of the first cross members, and a second number of brake housings having a brake, each of the brake housings operably coupled to one of the first number of wheels and configured to apply a braking force to its respective wheel when its brake is engaged. The service cart may be configured such that at least one of the second cross members is an adjustable cross member configured to be adjustably disposed between two of the second brace members lengthwise at an orthogonal angle to each of the second brace members within a specified degree of tolerance and wherein each of the adjustable cross members comprises a support pad configured to provide a support force in a direction substantially parallel to the lengthwise orientation of the support members within a specified degree of tolerance.

Another aspect of this disclosure is directed to a service cart suitable for servicing electric vehicles and vehicle batteries. The service cart may have a frame comprising a number of first brace members, a number of second brace members, a number of support members, a number of first cross members and a number of second cross members. Each of the support members are disposed between a first brace member and a second brace member. Each of the first cross members are disposed between ones of the number of first brace members. Each of the second cross members are disposed between ones of the number of second brace members. The service cart may further comprise a number of wheels, each of the wheels operably coupled to at least one of the first brace members or one of the first cross members. The service cart may further comprise a number of brake housings having a brake, each of the brake housings operably coupled to one of the number of wheels and configured to apply a braking force to its respective wheel when its brake is engaged, wherein the brakes of the brake housings are configured to selectively engage. In some embodiments, the service cart may further comprise a handle mount coupled to a first brace member or a first cross member, and a handle having a pushrod and configured to be detachably coupled to the handle mount, wherein the brakes of the wheels are selectively engaged according to the position of the pushrod.

A further aspect of this disclosure is directed to a service cart suitable for servicing electric vehicles and vehicle batteries. The service cart may have a frame comprising a number of first brace members, a number of second brace members, a number of support members, a number of first cross members and a number of second cross members. Each of the support members are disposed between a first brace member and a second brace member, each of the first cross members are disposed between ones of the number of first brace members, and each of the second cross members are disposed between ones of the number of second brace members. The service cart may further comprise a number of wheels, each of the wheels operably coupled to at least one of the first brace members or one of the first cross members. The service cart may further comprise a number of brake housings having a brake, each of the brake housings operably coupled to one of the number of wheels and configured to apply a braking force to its respective wheel when its brake is engaged. The service cart may be configured such that the first cross members comprise a locking hinge and a number of the second cross members are folding second cross members that comprise a locking hinge, the first cross members and folding second cross members each being operable to adjust its respective coupling angles to its respective brace members when the locking hinge is disengaged, and the frame may be arranged into a compact form. The locking hinge may comprise a spring-loaded pin configuration.

Yet another aspect of the disclosure is directed to a service cart suitable for servicing electric vehicles and vehicle batteries. The service cart may have a frame comprising a number of first brace members, a number of second brace members, a number of support members, a number of first cross members and a number of second cross members. The frame may be configured such that each of the support members are disposed between a first brace member and a second brace member, each of the first cross members are disposed between ones of the number of first brace members, and each of the second cross members are disposed between ones of the number of second brace members. The service cart may further comprise a first number of wheels, each of the wheels operably coupled to at least one of the first brace members or one of the first cross members and a second number of brake housings having a brake, each of the brake housings operably coupled to one of the first number of wheels and configured to apply a braking force to its respective wheel when its brake is engaged. The frame may further be configured such that at least one of the second cross members comprises a support pad configured to provide a support force in a direction substantially parallel to the lengthwise orientation of the support members within a specified degree of tolerance, the support pad having a stem collar with a collar opening configured to receive a break pin, the break pin configured to be inserted into the collar opening and to break when subjected to a shearing force higher than a specified threshold value.

Another aspect of this disclosure is directed to a service cart suitable for servicing electric vehicles and vehicle batteries. The service cart may have a frame comprising a number of first brace members, a number of second brace members, a number of support members, a number of first cross members and a number of second cross members. The frame may be configured such that each of the support members are disposed between a first brace member and a second brace member, each of the first cross members are disposed between ones of the number of first brace members, and each of the second cross members are disposed between ones of the number of second brace members. The service cart may also comprise a number of wheels, each of the wheels operably coupled to at least one of the first brace members or one of the first cross members, and a number of brake housings having a brake, each of the brake housings operably coupled to one of the number of wheels and configured to apply a braking force to its respective wheel when its brake is engaged. The service cart may also comprise a tow hitch disposed upon the frame, the tow hitch operable to detachably couple the frame to an external towing device. At least one of the tow hitches may comprise pin coupling utilizing a number of tow hitches and a hitch pin.

The above aspects of this disclosure and other aspects will be explained in greater detail below with reference to the attached drawings.

BRIEF DESCRIPTION OF THE DRAWINGS

FIG. 10 is an illustration of a service cart having a braking system.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

It is understood that throughout this disclosure that specific angles measurements are provided by way of example and not limitation, unless otherwise noted herein. The phrase "substantially perpendicular" is used herein to indicate a 90-degree angle within a specified tolerance required for operability of the invention as recognized by one of ordinary skill in the art. The phrase "substantially parallel" is used herein to indicate a 0-degree angle within a specified tolerance required for operability of the invention as recognized by one of ordinary skill in the art. Any specific angle measurements that are provided are understood to be in practice within a specified tolerance required for operability of the invention as recognized by one of ordinary skill in the art.

Figure 1:
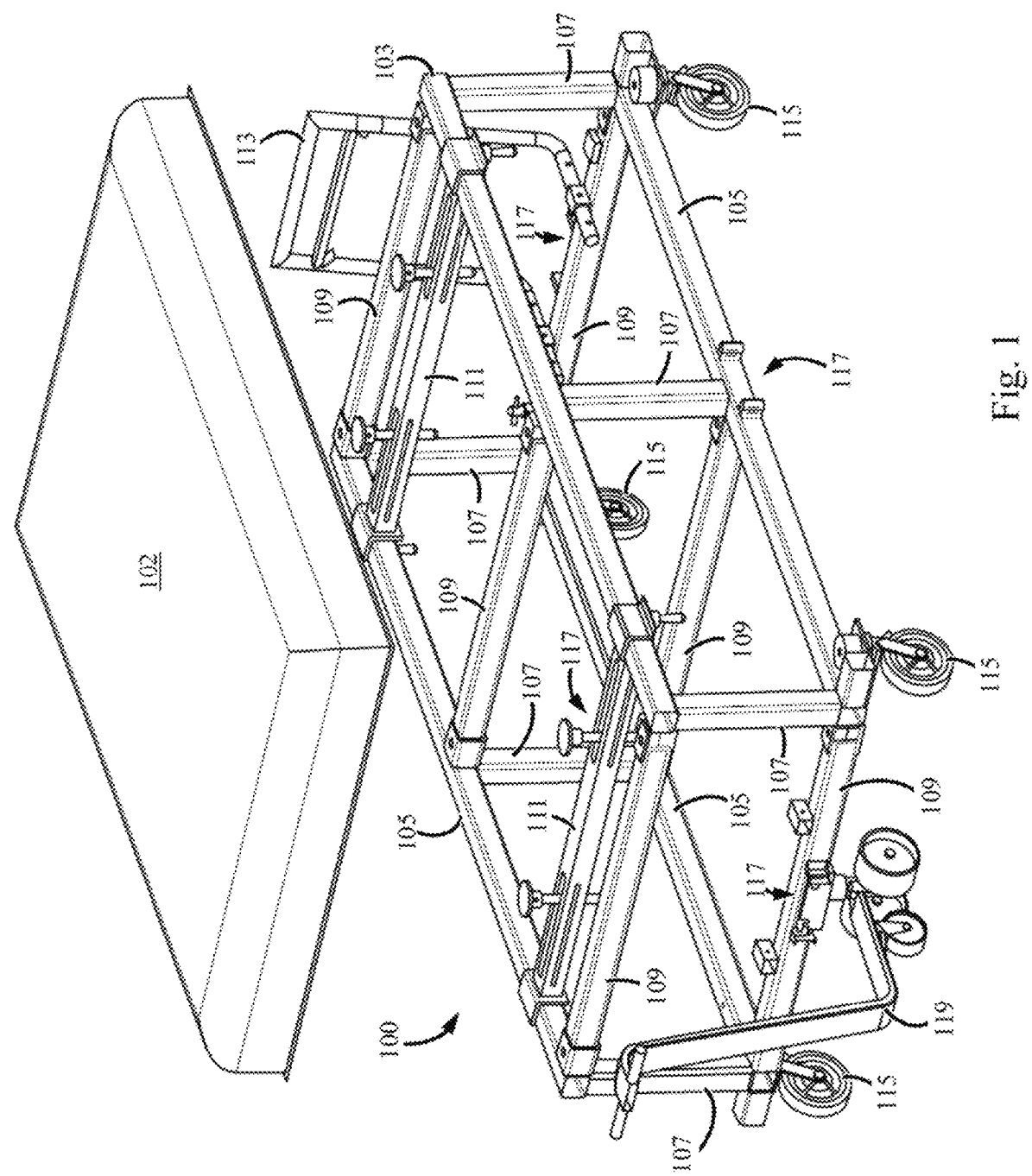
FIG. 1 is an illustration of a service cart.

FIG. 1 shows a service cart 100 configured to support a battery 102. Battery 102 may comprise a battery intended for use with an electric vehicle. In the depicted embodiment, battery 102 may comprise trapezoidal shape, but service cart 100 may be configured to accommodate and support batteries of different shapes and dimensions without deviating from the teachings disclosed herein.

Service cart 100 comprises a frame 103 suitable to support the weight of battery 102. Frame 103 is formed by a number of members coupled to provide a base of support for battery 102. Frame 103 may be comprised of a number of brace members 105 arranged substantially in parallel with respect to battery 102, and a number of support members 107 arranged substantially perpendicular with respect to battery 102. Each of brace members 105 may be coupled to one or more of support members 107 to form a bracing substructure of frame 103. In the depicted embodiment, the bracing substructures comprise couplings of brace members 105 and support members 107 at substantially perpendicular angles, but other embodiments may comprise other arrangements without deviating from the teachings disclosed herein. In the depicted embodiment, frame 103 comprises two bracing substructures, but other embodiments may comprise more bracing substructures without deviating from the teachings disclosed herein.

Frame 103 additionally comprises a number of cross members 109 which join the substructures together to form the fill structure of frame 103. In the depicted embodiment, cross members 109 are coupled to brace members 105 and support members 107 in a manner resulting in an arrangement of each cross member 109 such that it is disposed at an angle substantially perpendicular to both the respective brace members 105 and support members 107 to which it is coupled. In the depicted embodiment, frame 103 is comprised of six cross members 109, but other embodiments may comprise other configurations without deviating from the teachings disclosed herein. Frame 103 may also comprise a number of adjustable cross members 111, which may be configured to receive different configurations of a battery. Adjustable cross members 111 may be detachable from frame 103 without deviating from the teachings disclosed herein. In the depicted embodiment, adjustable cross members 111 are detachably coupled to frame 103, but other embodiments may comprise other configurations for some or all of adjustable cross members 111 without deviating from the teachings disclosed herein.

Service cart 100 may also comprise a handle 113 and a number of wheels 115, which permit a technician the ability to move service cart 100. In the depicted embodiment, handle 113 may be coupled to one of cross members 109 and each of wheels 115 may be coupled to frame 103, but other embodiments may comprise other configurations without deviating from the teachings disclosed herein.

Service cart 100 may additionally comprise a number of tow hitches 117, which are configured to receive an external towing device such as an electric tow device 119. The external tow device may detachably couple to service cart 100 via one of tow hitches 117, to assist a user in moving service cart 100 when under load. In the depicted embodiment, each of tow hitches 117 is coupled to frame 103, but other embodiments may comprise other configurations without deviating from the teachings disclosed herein. In the depicted embodiment, tow hitches 117 are configured to couple with an electric tow device 119, but other embodiments may configured to couple with other or additional types of external tow device without deviating from the teachings disclosed herein. The depicted embodiment comprises four tow hitches 117, but other embodiments may comprise other configurations without deviating from the teachings disclosed herein.

Figure 2:
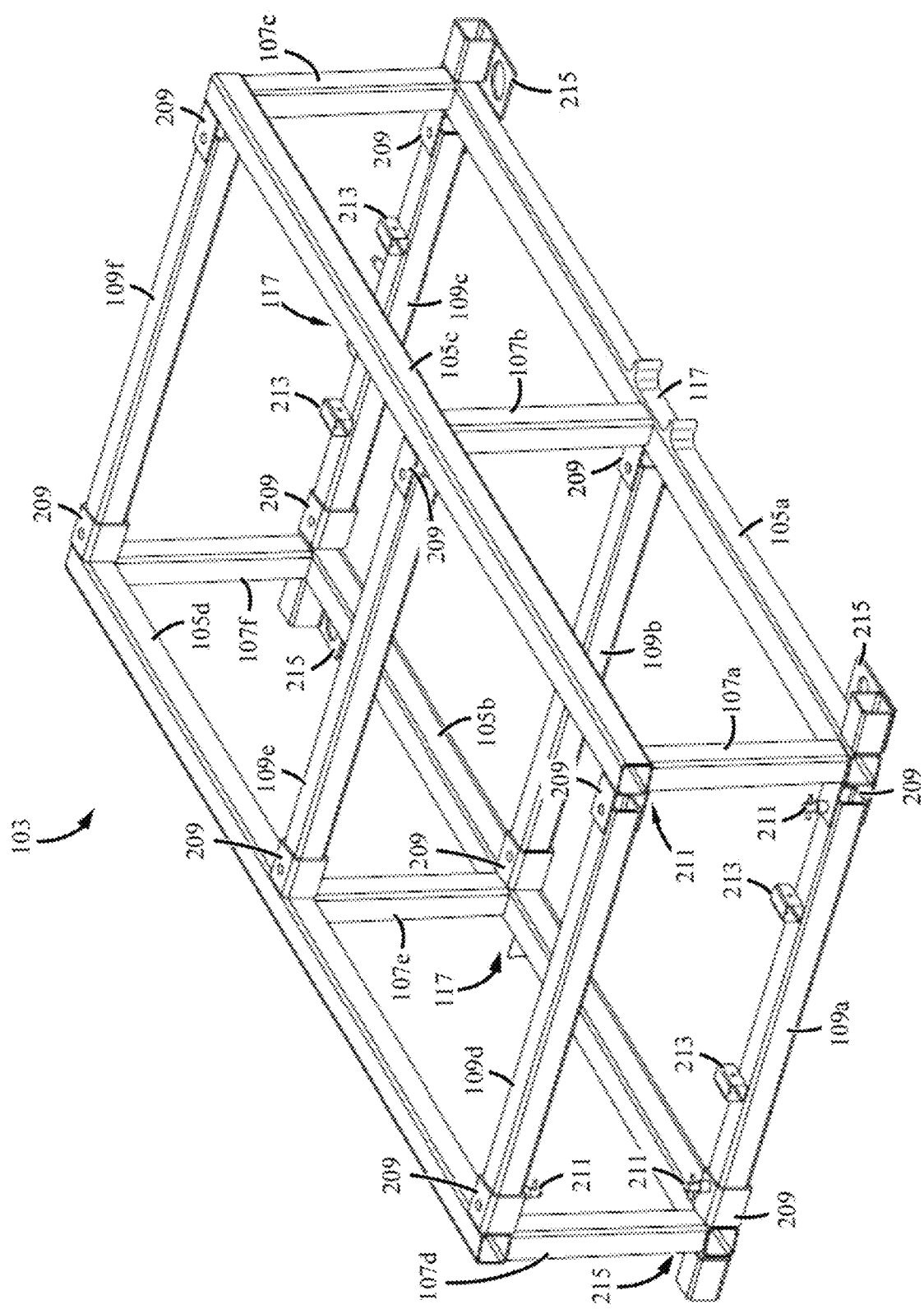
FIG. 2 is an illustration of a frame of a service cart.

FIG. 2 provides an additional view of the components of frame 103. In this view, each of brace members 105, support members 107, and cross members 109 have been identified as one of sequence for the purposes of viewing orientation in FIG. 2 and following figures. In the depicted embodiment, brace members 105a and 105b comprise a set of first brace members that are configured to be disposed nearer to the ground than a loaded battery (such as battery 102, see FIG. 1) when frame 103 is assembled and service cart 100 (see FIG. 1) is under load. In the depicted embodiment, brace members 105c and 105d comprise a set of second brace members that are configured to be disposed nearer to the battery than the ground when frame 103 is assembled and service cart 100 is under load. In the depicted embodiment, cross members 109a, 109b, and 109c comprise a set of first cross members configured to be coupled with each of the first brace members. In the depicted embodiment, cross members 109d, 109e, and 109f comprise a set of second cross members configured to be coupled between the second brace members. Other embodiments may have different sets of brace members 105, support members 107, and cross members 109 without deviating from the teachings disclosed herein.

Frame 103 may also comprise additional features that provide functionality to service cart 100. In the depicted embodiment, each of cross members 109 may be coupled to other members of frame 103 via a number of hinges 209. Hinges 209 may be configured to permit a range of motion for their respective cross member 109 with respective attached brace member 105 or support member 107. In the depicted embodiment, each of hinges 209 is coupled to a brace member 105 on either side of frame 103, but other embodiments may comprise hinges coupled to support members or a combination of brace members and support members without deviating from the teachings disclosed herein.

Hinges 209 may advantageously permit an arrangement of the cross members 109 with respect to the brace members 105 and support members 107 to achieve particular configurations of frame 103. In the depicted embodiment, frame 103 is arranged as a rectangular prism, but other embodiments may be configured differently to advantageously support different batteries having different shapes without deviating from the teachings disclosed herein. In the depicted embodiment, hinges 209 may have a range-of-motion of 180 degrees with respect to an associated brace member 105, but other embodiments may comprise other configurations without deviating from the teachings disclosed herein.

In some embodiments, hinges 209 may comprise a free-floating rang-of-motion. In the depicted embodiment, however, it may be advantageous for some or all of hinges 209 to comprise a hinge lock 211 operable to fix an associated hinge 209 at a particular angular arrangement. In the depicted embodiment, hinge locks 211 comprise spring-loaded pin locks that are configured to be received by hinges 209, but other embodiments may comprise other locking mechanisms without deviating from the teachings disclosed herein. Hinge locks 211 may be operable to fix the arrangement of their respective associated hinges 209 in a number of predefined angles, or may be configured to permit any angle without deviating from the teachings disclosed herein. In the depicted embodiment, hinge locks 211 are present for hinges 209 associated with cross members 109a and 109d, but other embodiments may comprise hinge locks 211 present for any configuration of hinges 209 without deviating from the teachings disclosed herein.

Frame 103 further comprises features that are useful in supporting other elements of service cart 100 (see FIG. 1). In the depicted embodiment, frame 103 comprises a number of handle hitches 213 operable to detachably couple to a handle, such as handle 113 (see FIG. 1). In the depicted embodiment, hinge hitches 213 are coupled to cross members 109a and 109c, but other embodiments may other configurations without deviating from the teachings disclosed herein.

Frame 103 may further comprise a number of wheel mounts 215 configured to provide a mounting position for wheels coupled to the frame 103 during full assembly of service cart 100, such as wheels 115 (see FIG. 1). In the depicted embodiment, frame 103 comprises wheel mounts 215 at intersections of brace members 105 and cross members 109 that form a lower-most and outer-most joint of the frame body. Other embodiments may comprise additional or alternative placements of wheel mounts 215 without deviating from the teachings disclosed herein. By way of example, and not limitation, frame 103 may comprise a wheel mount 215 associated with every intersection of one of the first set of brace members 105 (e.g., brace members 105a and 105b) and a support member 107.

Figure 3:
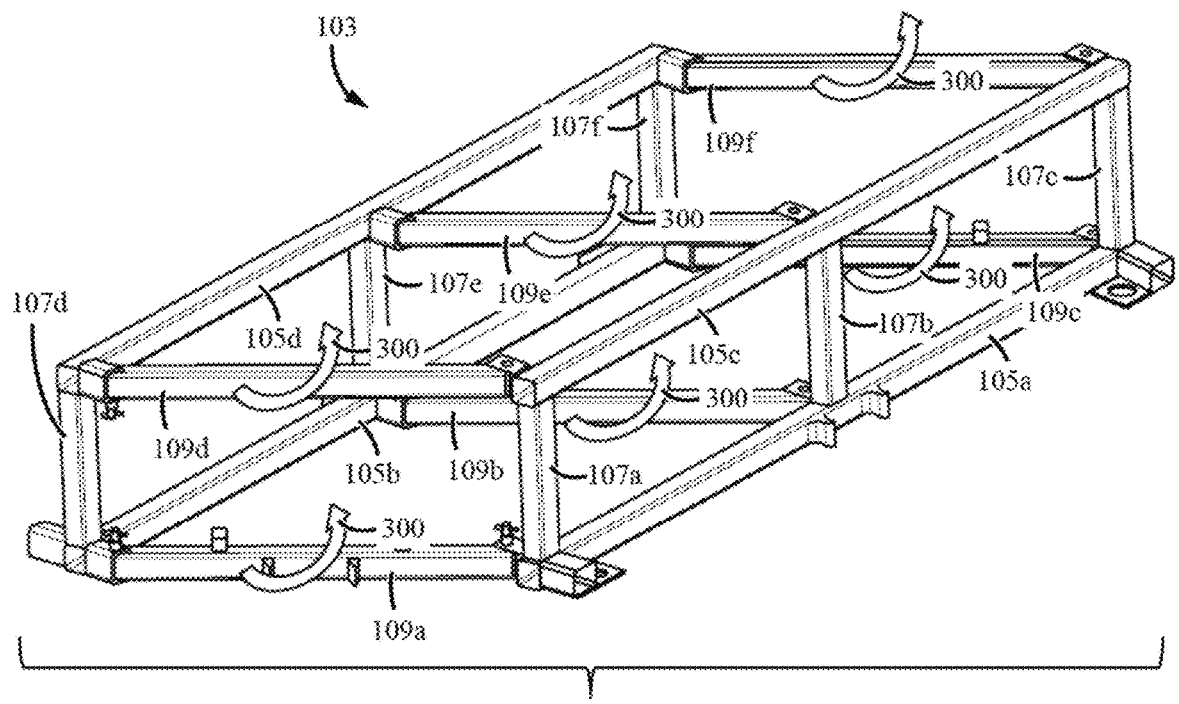
FIG. 3 is an illustration of a frame of a service cart in a first arrangement.
Figure 4:
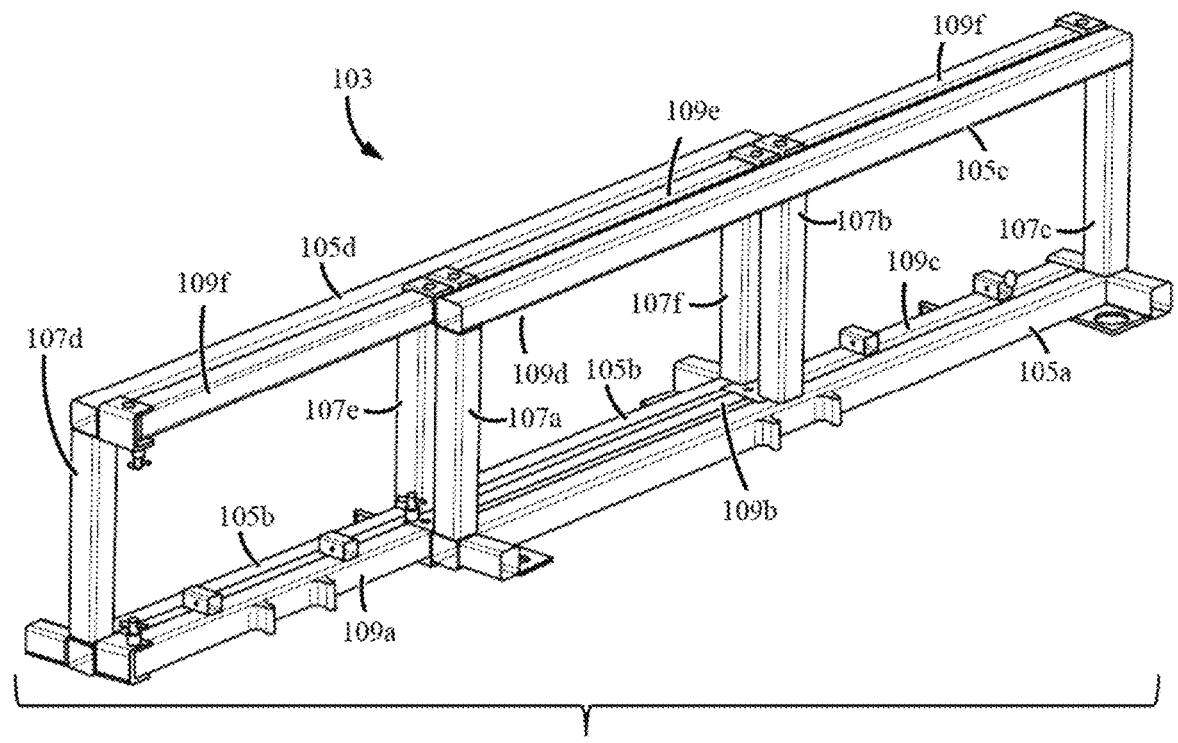
FIG. 4 is an illustration of a frame of a service cart in a second arrangement.

An additional advantage of the implementation of hinges 209 is that frame 103 may be placed into a more compact or portable arrangement for storage or travel. FIG. 3 illustrates a first arrangement of frame 103 being configured into a second, more compact arrangement as shown in FIG. 4. In FIG. 3, cross members 109 are arranged via their respective hinges (not shown, see FIG. 2) in a direction 300. Because each of the cross members 109 are coupled to other members of frame 103, the direction 300 is equally applied to each of the cross members 109 in unison. Other embodiments may have different configurations that result in non-unison arrangement adjustments without deviating from the teachings herein. In the depicted embodiment, the unison reconfiguration of the arrangement of frame 103 may advantageously be performed by a single technician.

FIG. 4 is an illustration of frame 103 after having been arranged into a compact form. The compact form of frame 103 may be achieved because cross members 109 comprise folding cross members that may be arranged into a desired minimum angle, and in the depicted arrangement each of cross members 109 have been arranged at 0-degree angles with respect to brace members 105. Notably, this arrangement is achieved because of the joints associated with each of cross members 109 via hinges 209 (see FIG. 2). Hinges 209 may comprise locking hinges having hinge locks 211 (see FIG. 2) may be utilized to restrict the motion of cross members 109 once placed into the compact arrangement. FIG. 4 depicts the frame 103 in the compact arrangement without other elements of service cart 100 (see FIG. 1), but frame 103 may be configured into a desired arrangement while still coupled to other elements of service cart 100 such as wheels 115 or handle 113 without deviating from the teachings disclosed herein. Configuration of the arrangement of frame 103 while still coupled to wheels 115 may advantageously permit a technician or other user to more easily move the compacted frame 103 into a storage location.

Returning to FIG. 1, service cart 100 comprises a number of adjustable cross members 111 arranged between individual brace members 105 from the second set of brace members. In the depicted embodiment adjustable cross members 111 may be detachably coupled to frame 103, but other embodiments may comprise other couplings, such as utilization of a hinge, without deviating from the teachings disclosed herein. In the depicted embodiment, adjustable cross members 111 may advantageously be coupled to frame 103 by way of a clamp mechanism, but other embodiments may comprise other coupling mechanisms without deviating from the teachings disclosed herein. In the depicted embodiment, the clamp mechanism may comprise a screw lock to advantageously provide stability in the placement of an adjustable cross member 111 at a selected point lengthwise along its associated brace members 105.

In the depicted embodiment, adjustable cross members 111 may be positioned at any point lengthwise along brace members 105 between cross members 109, but other embodiments may comprise other configurations without deviating from the teachings disclosed herein. In the depicted embodiment, adjustable cross members 111 are positioned at a particular point lengthwise along brace members 105 by initial placement during assembly of service cart 100, but other embodiments may comprise adjustable cross members 111 that can be adjustably positioned without decoupling from brace members 105. Placement of the adjustable cross members 111 to particular points along brace members 105 may advantageously permit service cart 100 to support a variety of batteries having a variety of dimensions and characteristics. In the some embodiments, brace members 105 may additional comprise markings to provide placement guidance for a technician to properly ensure that adjustable cross members 111 are in an appropriate position with respect to brace members 105 to accommodate a particular battery shape. In such embodiments, the markings may comprise a number of hash markers providing a ruler measurement system. Some configurations may comprise other marking systems suitable to accommodate specific varieties of battery design, such as particular battery configurations from one particular manufacturer or compatible with vehicles from a particular automaker. Such embodiments may advantageously provide easy configuration of service cart 100 for a particular line of vehicles, and may be more desirable to technicians that only work on those particular vehicles.

Figure 5:
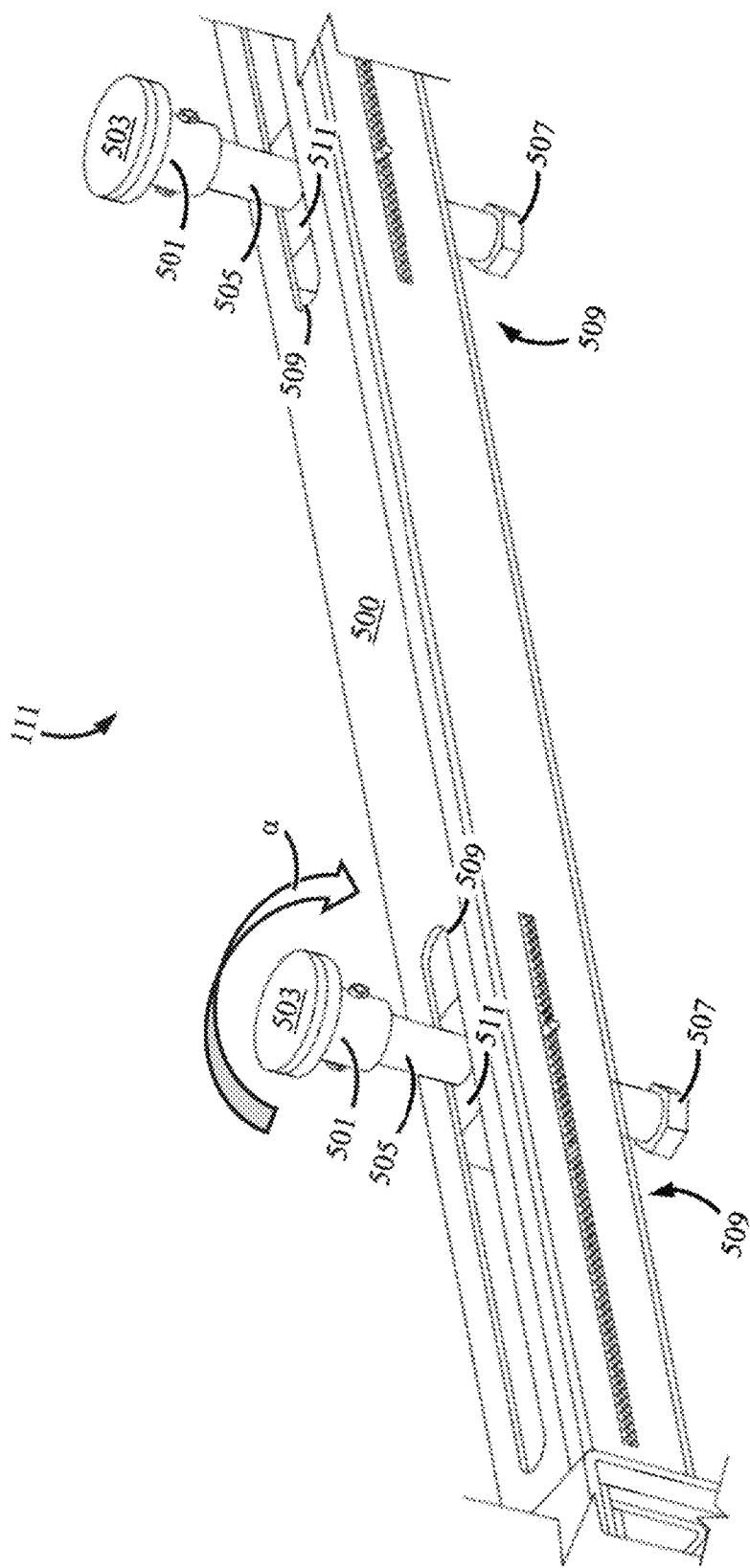
FIG. 5 is an illustration of an adjustable cross member of a service cart.

FIG. 5 is an illustration of features of an adjustable cross member 111. Adjustable cross member 111 is comprised of member body 500. In order to accommodate a variety of battery designs, adjustable cross member 111 also comprises a number of support pads 501. Support pads 501 are configured to be in direct contact with the battery when service cart 100 (see FIG. 1) is under load, and thus all of support pads 501 of service cart 100—and by proxy, all of adjustable cross members 111—in combination must be configured to properly support the specified weight of a battery. Each of support pads 501 comprises a pad facet 503 configured to be in direct contact with an exterior surface of the battery when service cart 100 is under load. Pad facet 503 may advantageously utilize a high-friction material to help retain the battery in position when the service cart is under load. In the depicted embodiment, pad facet 503 may comprise a polymer such as silicone, but other embodiments may use any other material without deviating from the teachings disclosed herein.

Support pad 501 further comprises a pad stem 505 which may advantageously be utilized to adjusted the vertical height of support pad 501 with respect to member body 500. In the depicted embodiment, the height adjustment of support pad 501 may be accomplished by turning a stem bolt 507 that is coupled to one end of pad stem 505, but other embodiments may comprise other configurations without deviating from the teachings disclosed herein. In the depicted embodiment, stem bolt 507 may comprise a screw bolt configured to engage a screw receiver within the interior of pad stem 505 (not shown). In the depicted embodiment, stem bolt 507 additionally advantageously secures pad stem 505 such that pad stem 505 cannot accidentally be removed from within member body 500.

Each of support pads 501 is threaded through member body 500 via a pair of stem channels 509. Each of support pads 501 is threaded through its respective stem channels 509 such that its respective pad stem 505 may be placed at a position along the length of member body 500. In the depicted embodiment, each of stem channels 509 is configured to provide low friction to the movement of a pad stem 505, but also is narrow enough compared to the diameter of a pad stem 505 that a respective support pad 501 cannot rotate in a direction α freely. In the depicted embodiment, pad stems 505 thread through the entire height of member body 500, and thus pass through two distinct stem channels 509 on opposite sides of member body 500. Other embodiments may comprise different configurations without deviating from the teachings disclosed herein.

In the depicted embodiment, each pad stem 505 is additionally threaded through a glide block 511 disposed within the interior of member body 500. Pad stem 505 may be threaded in such a way that the associated glide block 511 is coupled to pad stem 505 while threaded, such as a screw thread configuration. Each glide block 511 may advantageously permit positioning of support pad 501 in a lengthwise direction with respect to member body 500.

Figure 6:
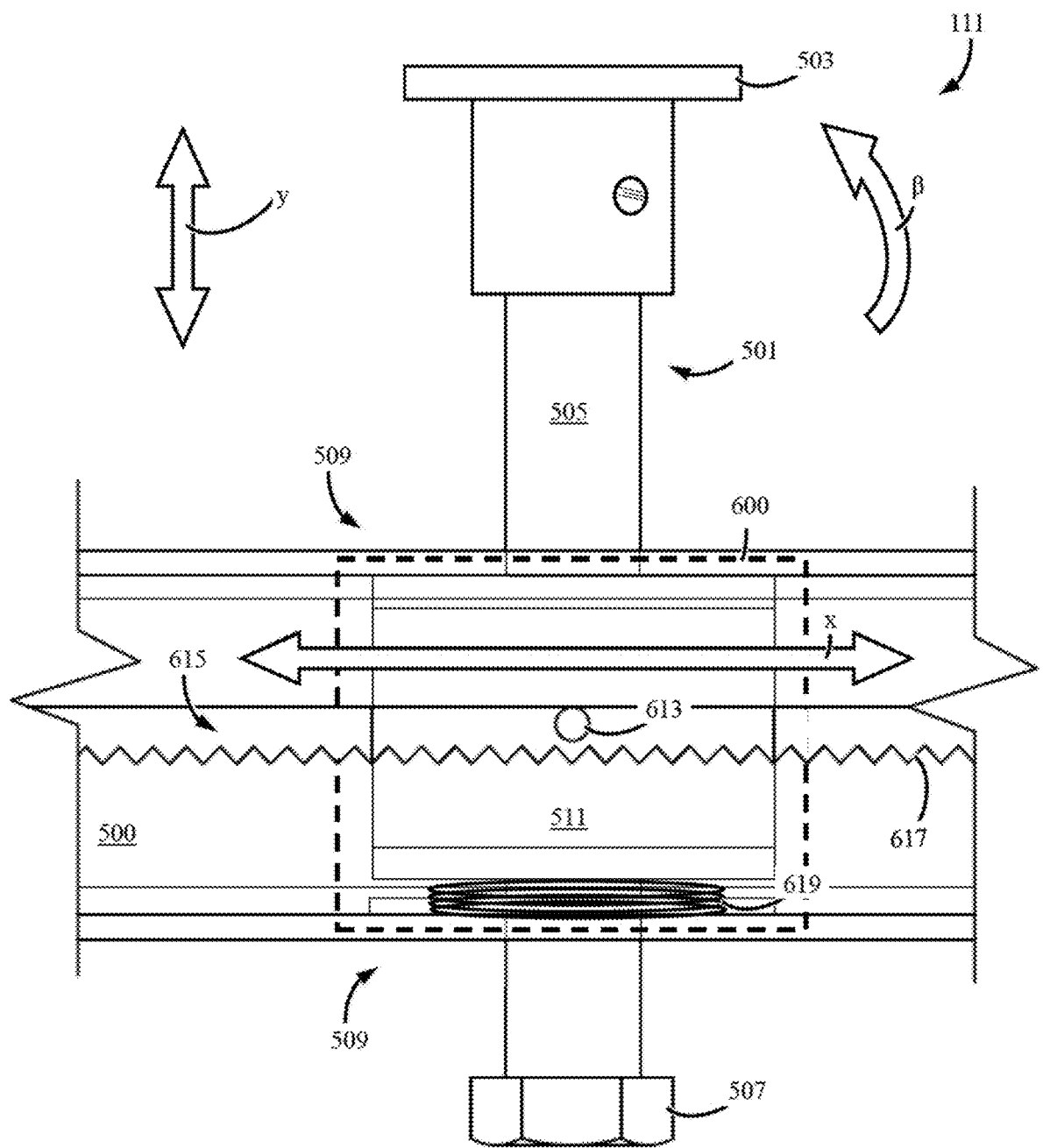
FIG. 6 is a diagrammatic view of a support pad and glide block within the member body of an adjustable cross member of a service cart.

FIG. 6 provides an alternative side view of support pad 501 and glide block 511 with respect to a member body 500 of adjustable cross member 111. In the depicted embodiment, a portion of the interior of member body 500 is visible within a cutaway line 600. In the depicted embodiment, the position of support pad 501 is adjustable in two dimensions. The height adjustments of support pad 501 control the position support pad 501 along a direction y in the manner described above with respect to FIG. 5. FIG. 6 additionally shows a direction x which constitutes the lengthwise direction of member body 500. In the depicted embodiment, stem channels 509 are configured such that pad stem 505 may freely move along direction x, though other embodiments may comprise other configurations without deviating from the teachings disclosed herein. Glide block 511 helps to ensure only linear positioning of support pad 501 occurs by preventing rotational motion along a direction β.

Glide block 511 additionally comprises a lock pin 613 disposed within a lock channel 613 of member body 500. Lock channel 613 is distinct from stem channels 509 because one edge is configured as a set of channel teeth 617. When the associated support pad 505 is subject to a downward load against support facet 503 (such as when supporting a battery), lock pin 613 may be forced between two adjacent ones of channel teeth 617. When lock pin is forced between adjacent ones of channel teeth 617, glide block 511 may be inoperable to move along direction x, and support pad 501 may advantageously be in a fixed position while under load. In order to ensure that support pad is freely positionable when not under load, glide block 511 may comprise a glide spring 619 operable to provide an upward force along direction y when not under load. Because pad support 501 and glide block 511 are effectively coupled when pad stein 505 is threaded through glide block 511, application of pressure from the battery onto surface facet 503 will provide a force against the upward force provided by glide spring 619. In the depicted embodiment, the associated battery may be very heavy, but glide spring 619 need not provide sufficient force to support a significant portion of the battery weight to be effective, and instead only need to provide enough force to counter the combined weight force of support pad 501 and glide block 511 when coupled but unloaded. In the depicted embodiment, glide spring 619 may be operable to provide a sufficiently low upward force that a technician may easily fix glide support 511 in place by hand when inspecting its operation. By way of example, and not limitation, the depicted embodiment may comprise a glide spring 619 capable of generating 10 pounds of force, but other embodiments may comprise other specifications without deviating from the teachings known to one of ordinary skill in the art. However, it is recognized that preferred embodiments of glide springs 619 will not provide sufficient force in combination with all glide springs of the associated embodiment as to fully support the weight of a battery providing a load to the service cart 100 (see FIG. 1). In the depicted embodiment, lock pin 613 may advantageously be configured to withstand much greater shear forces that an associated glide spring 619, as lock pin 613 will remain subjected to a greater amount of weight from the battery when the service cart is under load. By way of example and not limitation, in the depicted embodiment lock pin 613 may be suitable to withstand up to 1000 pounds of shear force when under load, but other embodiments will comprise other configurations suitable for their associated expected loads without deviating from the teachings disclosed herein.

Member body 500 may additional comprise markings or measurements thereon to provide users and technicians a measurable indication of the position of a support pad 501. In some embodiments, the channel teeth 617 may be numbered or marked with distance measurements to provide an indication of position (not shown). In other embodiments, some or all of channel teeth 617 may comprise specified colorations indicating particular positions for support pads 501 with respect to a particular make of battery to be supported (not shown). Other markings may be utilized in other embodiments without deviating from the teachings disclosed herein.

Figure 7:
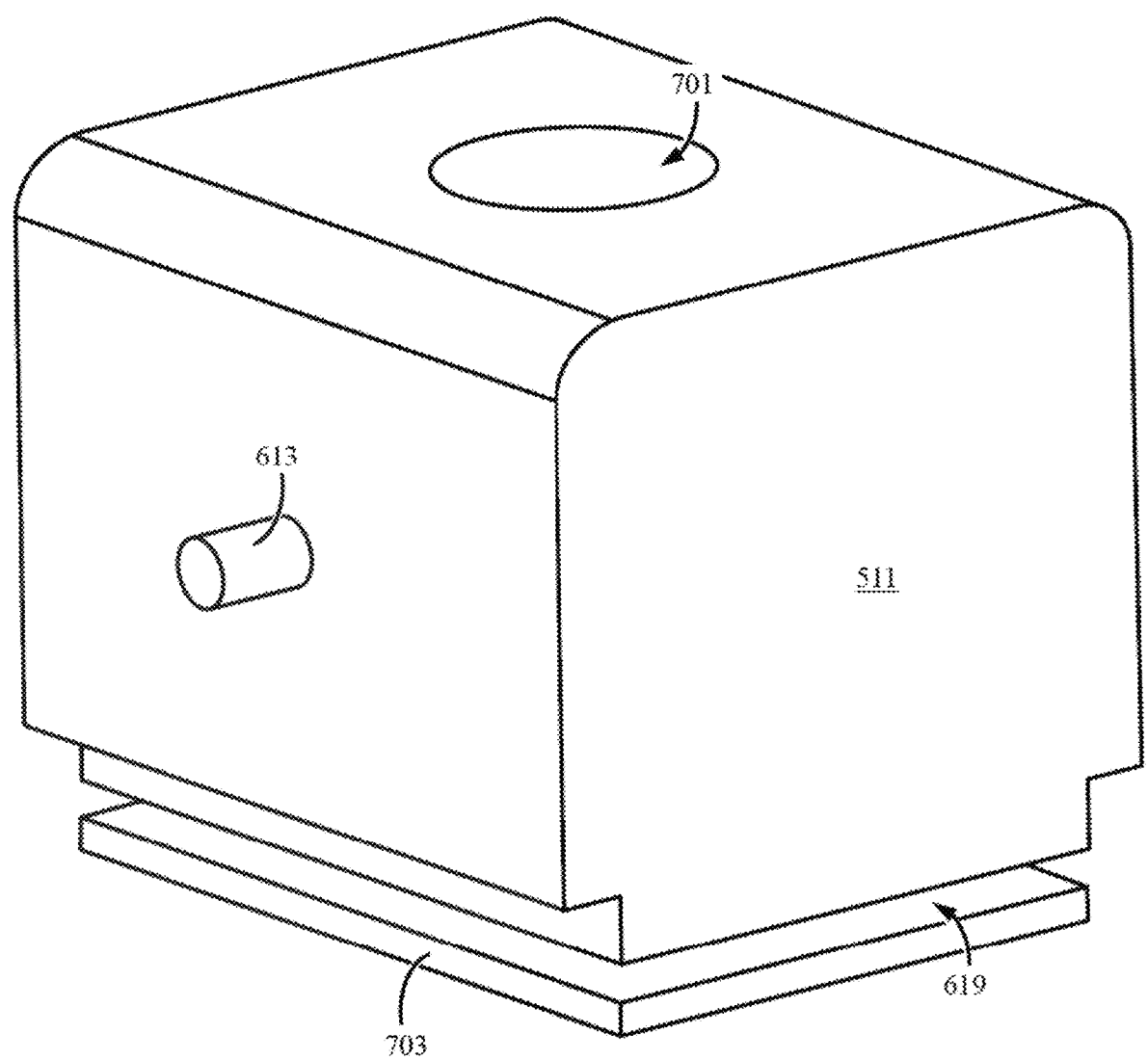
FIG. 7 is an illustration of a glide block for use within the interior portion of a member body of an adjustable cross member of a service cart.

FIG. 7 is an illustration of glide block 511 independent of its arrangement with respect to a member body 500 (see FIG. 5 and FIG. 6) of an adjustable cross member 111. Glide block 511 is comprised of lock pin 613 and glide spring 619. In some embodiments, glide block 511 may comprise additional or differently configured lock pins 613 without deviating from the teachings disclosed herein. In embodiments having multiple lock pins 613 on opposite sides of glide block 511, the member body 500 of the adjustable cross member 111 may comprise multiple lock channels 615 (see FIG. 6) to accommodate the glide block 511. In configurations having multiple lock pins 613, the specified shear force tolerance of the lock pins 613 may collectively be able to withstand the specified weight when under load. By way of example, and not limitation, a glide block 511 having 4 load pins 613 may still be operable to withstand 1000 pounds of shear force, but each individual lock pin 613 may be specified to withstand 250 pounds of shear force independently (¼ the total maximum load). Such embodiments may advantageously reduce the expense of glide block 511 by utilizing less expensive materials for lock pins 613. Other embodiments may comprise other configurations without deviating from the teachings disclosed herein.

FIG. 7 additionally illustrates a stem receiver 701 operable to receive and thread a pad stem 505 (see FIG. 5). In the depicted embodiment, stem receiver 701 may comprise an interior having a screw threading to match a screw thread of an associated pad stem 505, but other embodiments may comprise other configurations without deviating from the teachings disclosed herein.

Glide block 511 may additionally comprise a glide shoe 703, configured to be inserted into an interior slot (not shown) within member body 500 (see FIG. 5 and FIG. 6). Glide shoe 703 may engage the interior slot with a low coefficient of friction to permit glide block 511 to move freely within member body 500 when not under a load. However, utilizing glide shoe 703 with an interior slot may advantageously prevent glide block 511 from spinning or otherwise becoming displaced within member body 500 such that a pad stem 505 cannot be successfully threaded through stem receiver 701 during assembly, repair, or re-assembly of adjustable cross member 111. Some embodiments may not comprise a glide shoe 703 or an interior slot of member body 500 without deviating from the teachings disclosed herein.

Figure 8:
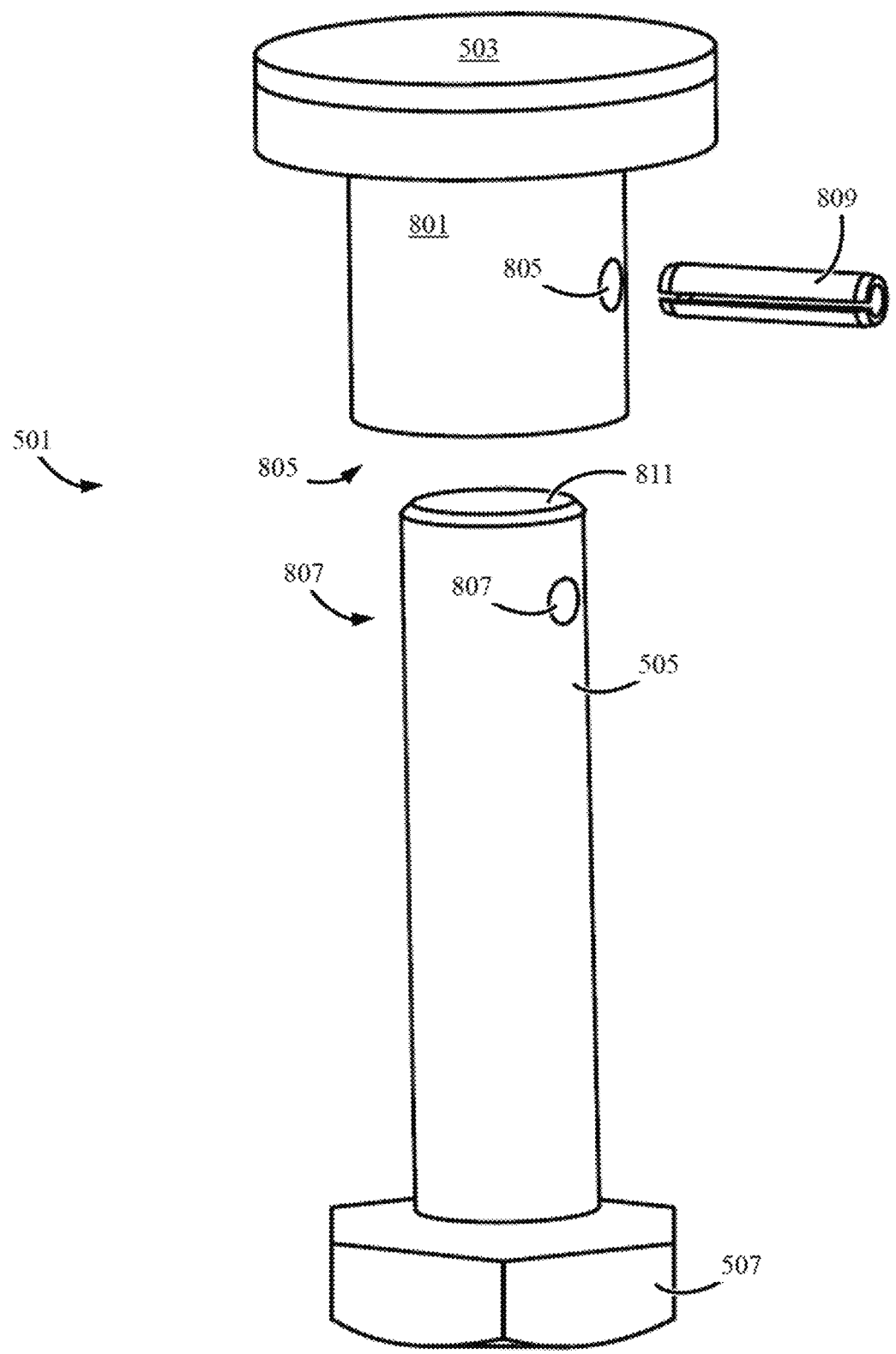
FIG. 8 is an exploded view of the components of a support pad of a service cart.

FIG. 8 comprises an exploded view of a support pad 501. In the depicted embodiment, stem bolt 507 is coupled to pad facet 503 via a stem collar 801 configured to receive pad stem 505. Support pad 501 is additionally comprised of a number of collar openings 805 forming a through hole within stem collar 801 and a number of stem openings 807 forming a through hole within pad stem 505. When stem collar 801 has received pad stem 505, collar openings 805 and stem openings 807 may be aligned such that a break pin 809 may be inserted into the through hole formed by their alignment.

Vehicle batteries are typically very heavy and disposed along the undercarriage of their associated vehicles. By way of example, and not limitation, a battery suitable for a typical electrical car may weigh between 1.000-3,000 pounds and the battery of an electric light truck may weigh 5,000 pounds or more. In the embodiments depicted herein, service cart 100 (see FIG. 1) may be specified to safely accommodate batteries having loads of over 5,000 pounds. Because of the weight and arrangement of batteries with respect to their electric vehicles, a conventional approach to loading service cart 100 may comprise using an additional high-powered lift (such as electric, pneumatic, hydraulic, or hybrid lifts found in conventional auto shops) to raise the entire vehicle to a height sufficiently high that service cart 100 may be placed underneath, and then slowly lower the vehicle onto service cart 100 until the battery makes contact with the support pads 501 (see FIG. 5) before uncoupling the battery from the associated electric vehicle. In such a procedure, the arrangement of service cart 100 is ideally properly configured to suit the battery it shall be receiving.

Break pin 809 may be designed to be an expendable component that is sacrificed when support pad 501 is subjected to more weight than is specified during the loading procedure. This sacrifice of break pin 809 may advantageously provide an audible, visual, or haptic feedback indication that one or more of support pads 501 have been subjected to excessive load, and the technicians may utilize such feedback to continue to utilize the high-powered lift to support the weight of the vehicle and/or the battery. Such feedback may advantageously protect the technicians from an unsafe load of service cart 100 and preserve the other components of service cart 100 from requiring repair or replacement if otherwise the service cart would be subjected to loads that may cause damage.

In the depicted embodiment, break pin 809 may be subjected to shearing forces from stem collar 801 when placed under load of a battery. Each of the support pads 501 of service cart 100 may be expected to be subjected to a partial load of the total weight of the battery. Therefore, break pin 809 may be advantageously configured to fail when subjected to a load beyond its associated specified capacity. By way of example and not limitation, in the depicted embodiment, break pin 809 may be specified to withstand up to 1,250 pounds of shearing force in order to accommodate a maximum battery weight of 5,000 pounds distributed across four distinct support pads 501 (see FIG. 1 and FIG. 5). In other embodiments, break pins 809 may be configured to accommodate smaller batteries of 1,000 pounds, and thus may only be specified to withstand shearing forces of 250 pounds. In some embodiments, break pins 809 may be specified to fail at a lower weight if it is assumed that the battery's own weight will not be evenly distributed upon the service cart 100. By way of example, and not limitation, if a battery weighs 1,000 pounds, but 70% of its weight is distributed to one side of its enclosure, half of break pins 809 may be specified to have a higher failure point (e.g., 350 pounds of shearing force) and the other half may be specified to have a lower failure point (e.g., 150 pounds) so that technicians can be made aware if the load of the battery is not properly distributed on the service cart 100 in a way that optimizes safety.

In the depicted embodiment, breakage of a break pin 809 may produce a loudly audible sound as break pin 809 fails. In some embodiments, a surface 811 of pad stem 505 may comprise an incomplete electric circuit (not shown) that may be completed by contact with an interior surface within stem collar 801. The completed electric circuit may be utilized to power a visual indicator such as light emitting diode, or an audible indicator such as a buzzer or siren. In some such embodiments, the collision of surface 811 with an interior surface may itself create a loud and distinct audible sound that indicates to a technician that an associated break pin 809 has been sacrificed.

Figure 9:
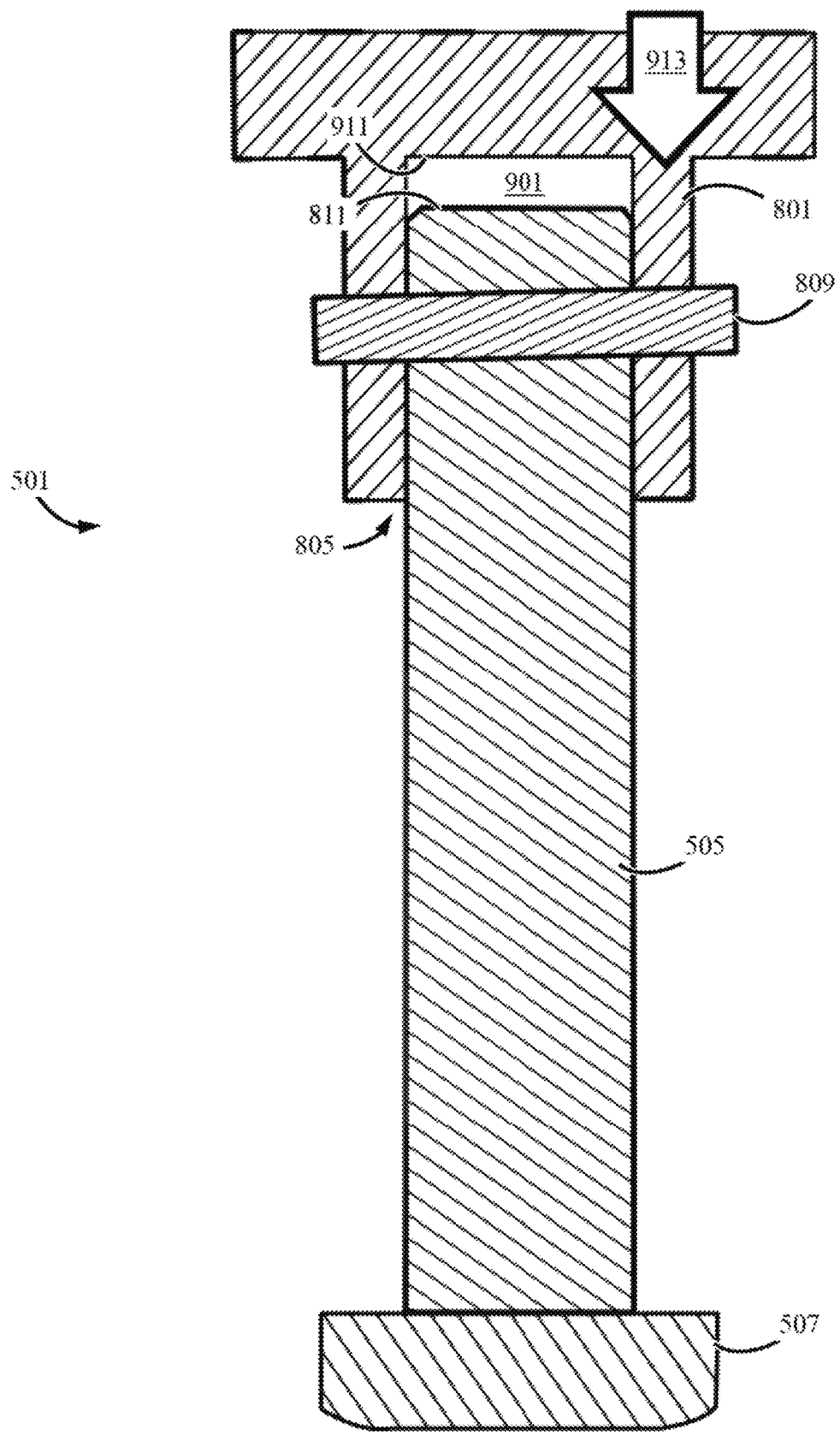
FIG. 9 is a cross-sectional view of a support pad when configured to receive an external load.

FIG. 9 is a cross-sectional view of an assembled support pad 501 when configured to be placed under load. In the depicted embodiment, pad stem 505 is received by an empty space 901 within stem collar 801. Break pin 809 is inserted into a through hole created by aligning the openings of pad stein 505 and stem collar 801. Break pin 809 may be utilized to keep some amount of distance between the surface 811 of pad stem 505 and within the empty space 901. In the event that break pin 809 fails because of excessive shearing force being applied to one or both ends by stem collar 801, the downward force 913 of the external load will push stem collar 801 down onto pad stem 505, causing a collision and contact between surface 811 and surface 911.

Service cart 100 may comprise other features directed to safety and ease-of-use for technicians. FIG. 10 is an illustration of service cart 100 that features a braking system integrated with handle 113. Handle 113 may be coupled to service cart 100 via a handle mount 1013. In the depicted embodiment, service cart 100 comprises a plurality of handle mounts 1013 mounted on either side of the frame 103 (see FIG. 1) of the cart, but other embodiments may comprise a different number of handle mounts 1013 without deviating from the teachings disclosed herein. In the depicted embodiment, handle 113 may be detachably coupled to service cart 100 such that it may be mounted on either side of the cart, but other embodiments may comprise a different coupling mechanism without deviating from the teachings disclosed herein. In the depicted embodiment of FIG. 10, service cart 100 may comprise an optional second handle 114, such that both handle 113 and handle 114 may be coupled to service cart 100 simultaneously using different handle mounts 1013. Having a plurality of handle mounts 1013 and coupling a plurality of handles to service cart 100 may advantageously provide ready access to the cart to a plurality of technicians, easing the effort needed for each technician to safely move the cart when under load. In the depicted embodiment, and throughout this description unless otherwise noted, handle 114 is identical in form and function to handle 113, but other embodiments may comprise a plurality of handles having distinct configurations without deviating from the teachings disclosed herein. Unless otherwise noted, descriptions of handle 113 within this disclosure also are applicable to handle 114 in embodiments comprising a second handle 114.

In the depicted embodiment, service cart 100 comprises a braking system comprised of brake cables 1015 that are configured to interface with handle 113 via handle mounts 1013. Each of wheels 115 comprises an associated brake housing 1017, inside of which is braking engagement mechanism (not shown). The engagement mechanism of each brake housing 1017 may be engaged via one of brake cables 1015. In the depicted embodiment, selective engagement of brake cables 1015 is accomplished via a control in handle 113. In the depicted embodiment, the brakes of wheels 115 are normally-engaged and the control in handle 113 may comprise a pushrod 1019 operable to selectively disengage the brakes (sometimes referred to as a "dead man's" control). Other embodiments may comprise other configurations, but the depicted embodiment may advantageously utilize a normally-engaged brake in order to maximize stability of the cart when under load without relying on a technician to tend to the brakes explicitly, improving the safety for the cart and the technician. Pushrod 1019 may provide an ergonomic control of the brakes such that a technician may easily disengage all brakes simultaneously while positioned at handle 113, thus advantageously maximizing comfortable operation of the cart, even when under load.

In the depicted embodiment, handle 113 may be detachably coupled to the cart via handle mounts 1013, and thus handle mounts 1013 provide a conduit to couple the pushrod 1019 in handle 113 to the brake cables 1015. Other embodiments may comprise other mechanisms for such coupling without deviating from the teachings disclosed herein. In embodiments having both handles 113 and 114, either handle may comprise a pushrod 1019 operable to selectively disengage the brakes. In some embodiments having both handles, such as carts that are designed to support very heavy loads, both handles may need to be selectively engaged to disengage the brakes of wheels 115, which advantageously encourages two technicians to be present when moving the cart under load, improving safety.

In the depicted embodiment, the pushrod 1019 of a single handle 113 may be operable to control brakes associated with each of wheels 115. To accommodate this, a number of cable duplexes 1021 are mounted onto the frame of service cart 100. Each cable duplex 1021 is configured to connect a single input brake cable 1015 that is coupled to handle 113 into a plurality of output brake cables 1015 that directly actuate the brakes of wheels 115. The depicted embodiment comprises a pair of cable duplexes 1021 situated on either side of handle mounts 1013, providing a coupled handle 113 access to the braking mechanisms of all brakes on side of the service cart 100 respective to handle 113. In such an embodiment, this configuration permits each brake associated with a wheel 115 of service cart 100 to be disengaged using a single control, such as pushrod 1019, on a single handle 113. In this configuration, pushrod 1019 is operable to disengage all the brakes when its associated handle 113 is mounted to service cart 100 and brake cables 1015 are coupled to it via handle mounts 1013. Other embodiments may comprise a different arrangement having a different number or configuration of cable duplexes 1021 without deviating from the teachings disclosed herein.

The depicted embodiment comprises a normally-engaged brake configuration that is accessed via pushrod 1019. Such a configuration may be cumbersome for a single technician who needs to move service cart 100. FIG. 11 comprises a close-up view of a feature of handle 113 that may be utilized to assist a single technician in operating the brakes.

Figure 11A:
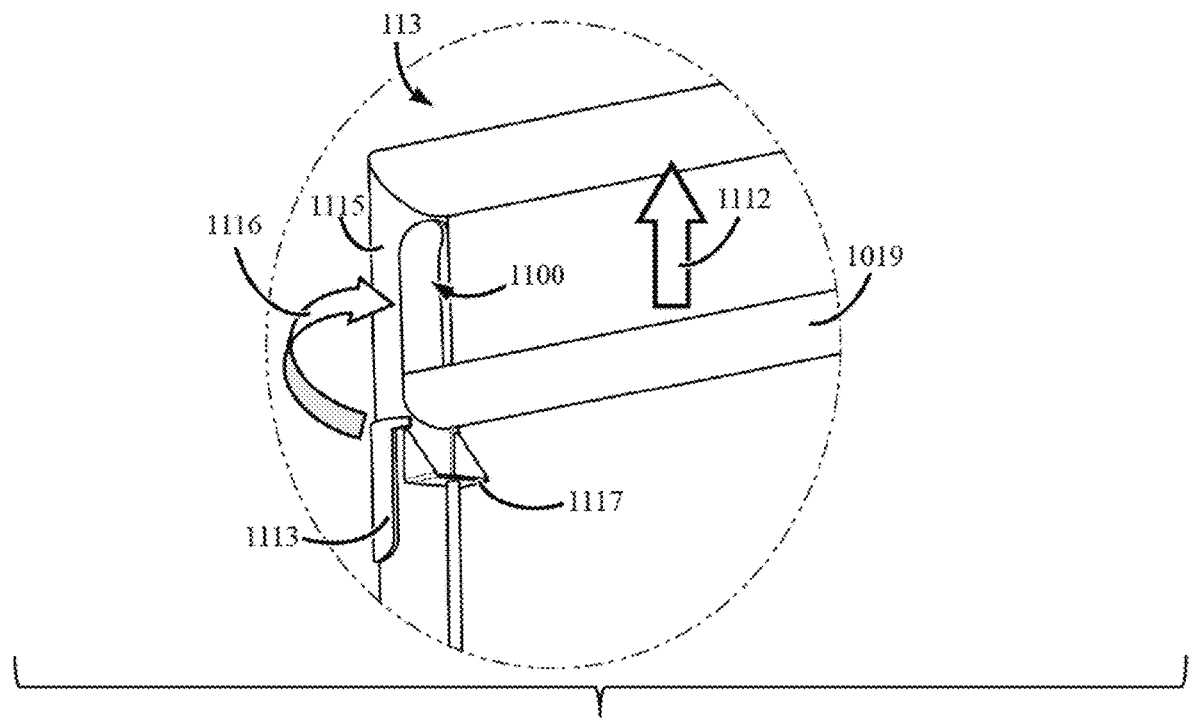
FIG. 11A is close-up illustration of a service cart handle having a brake mechanism in a first position.
Figure 11B:
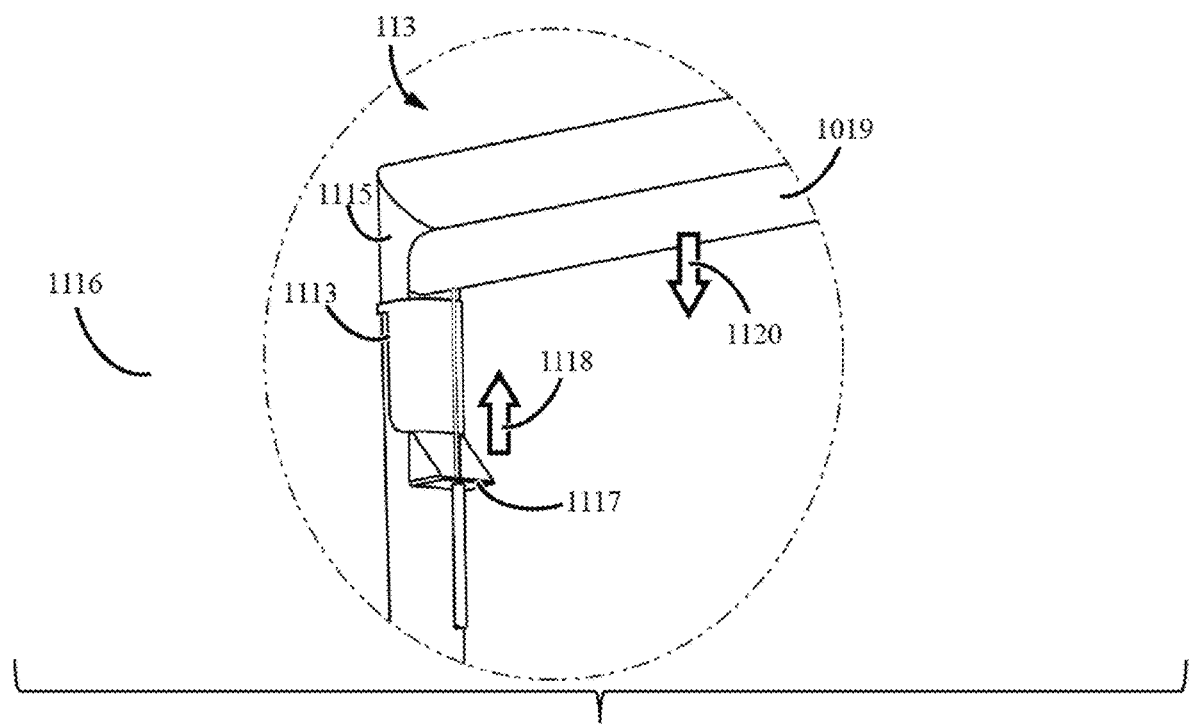
FIG. 11B is a close-up illustration of a service cart handle having a brake mechanism in a second position.

FIG. 11A provides a view of handle 113 when pushrod 1019 is not engaged (and thus the brakes of the cart are engaged). In the depicted arrangement, pushrod 1019 is inserted within a rod channel 1100 that permits the movement of pushrod 1019 along a pre-defined path to optimally disengage the brakes (not shown). Applying an upward force 1112 to pushrod 1019 can position the pushrod 1019 into an engaged position (thus disengaging the brakes). Handle 113 also comprises a latch 1113 operable to be positioned such that it can retain pushrod 1019 into the engaged position without continued application of force 1112. Latch 1113 comprises a sleeve latch that is operable to slide along the length of a handle member 1115. Latch 1113 is additionally operable to rotate about the exterior of handle member 1115. The combined motions of latch 1113 may be utilized to move latch 1113 in a direction 1116 into a position between pushrod 1019 when it is in an engaged position and a latch lock 1117 situation in a downward direction from pushrod 1019, as depicted in FIG. 11B. In FIG. 11B, latch lock 1117 provides a stabilizing force 1118 to oppose any downward force 1120 experienced by pushrod 1019 attempting to return to its normal disengaged state. Although the depicted embodiment comprises a sliding latch and a cylindrical handle member, other embodiments may comprise other latch mechanism configurations without deviating from the teachings disclosed herein. Some embodiments may not comprise a latching mechanism for any handles 113 of a service cart without deviating from the teachings disclosed herein.

Figure 12:
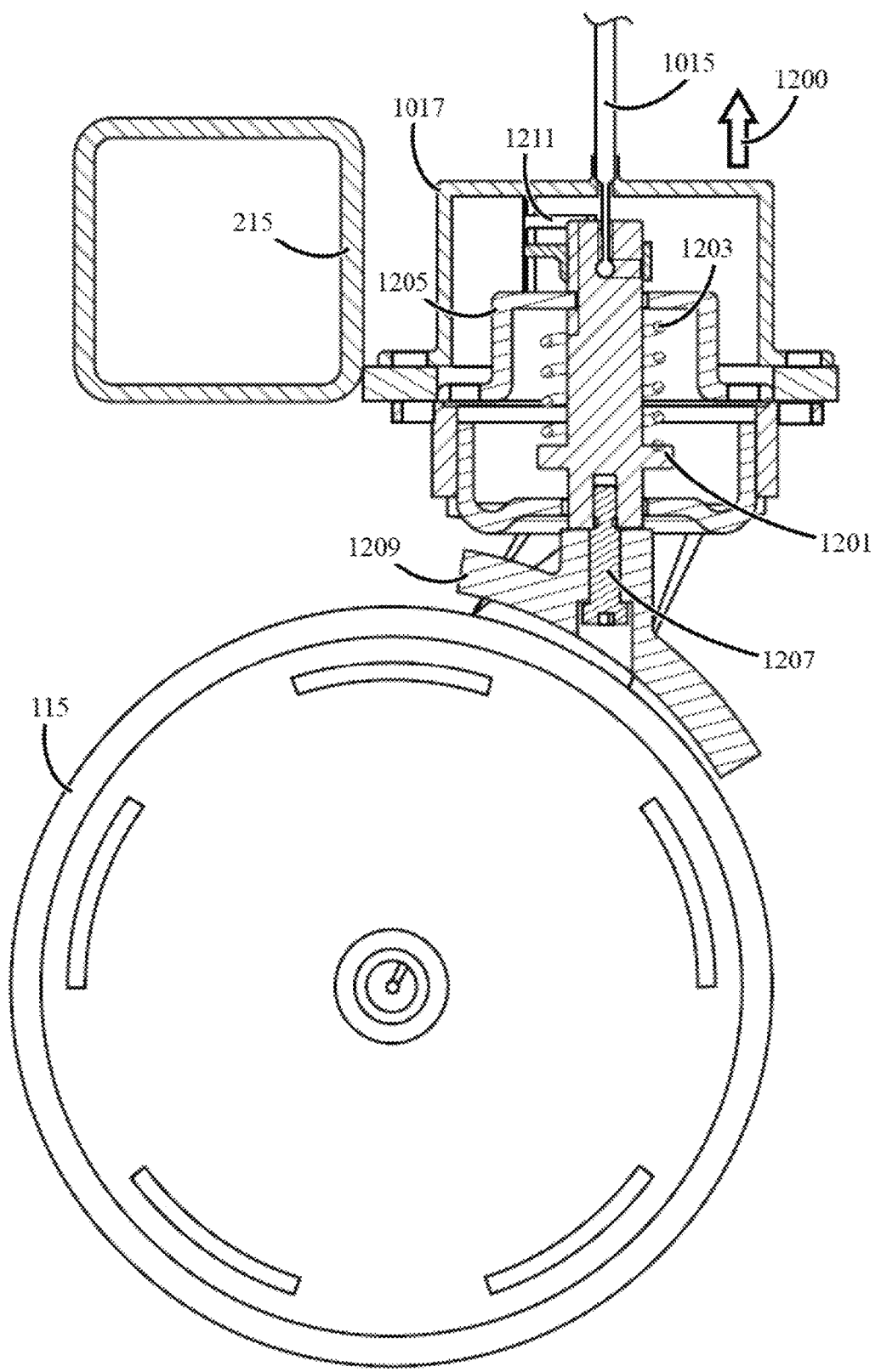
FIG. 12 is a cross-sectional view of a wheel and associated brake for a service cart.

FIG. 12 depicts a cross-sectional view of a wheel 115 attached to a service cart via a wheel mount 215 (see FIG. 2) and having brake housing 1017 actuated via a brake cable 1015 that is threaded through a portal of the brake housing. Brake cable 1015 is actuated by providing a force 1200 to a brake pushrod 1201. Brake pushrod 1201 is coupled to brake cable 1015, and is provided a normal force opposite direction 1200 via a compression spring 1203. The forces are transferred from the brake pushrod 1201 to a shoulder bolt 1207 and brake pad 1209, wherein brake pad 1209 is coupled to brake pushrod 1201 using the shoulder bolt 1207. When force 1200 is not present, compression spring 1203 provides a normal force that results in brake pad 1209 making contact with wheel 115. Thus, application of force 1200 via brake cable 1015 is required to disengage brake pad 1209 and permit wheel 115 to move freely. In the depicted embodiment, wheel 115 comprises a caster wheel that is able to swivel about an axis parallel to brake pushrod 1201, but other embodiments may comprise other configurations without deviating from the teachings disclosed herein. By way of example, and not limitation, wheel 115 may have 360 degrees of swivel motion about this axis, but other embodiments may comprise other configurations without deviating from the teachings disclosed herein. In the depicted embodiment, brake pad 1209 is operable to provide a braking force to the wheels in sufficient quantities to stabilize a service cart 100 (see FIG. 1) in combination with other similar brakes for the wheels available when under load. By way of example, and not limitation, the depicted embodiment may be operable to provide a braking force of 250 pounds. Other embodiments may comprise other braking forces suitable for different configurations of a service cart or different configurations of batteries providing a load to the service cart without deviating from the teachings disclosed herein.

Figure 13:
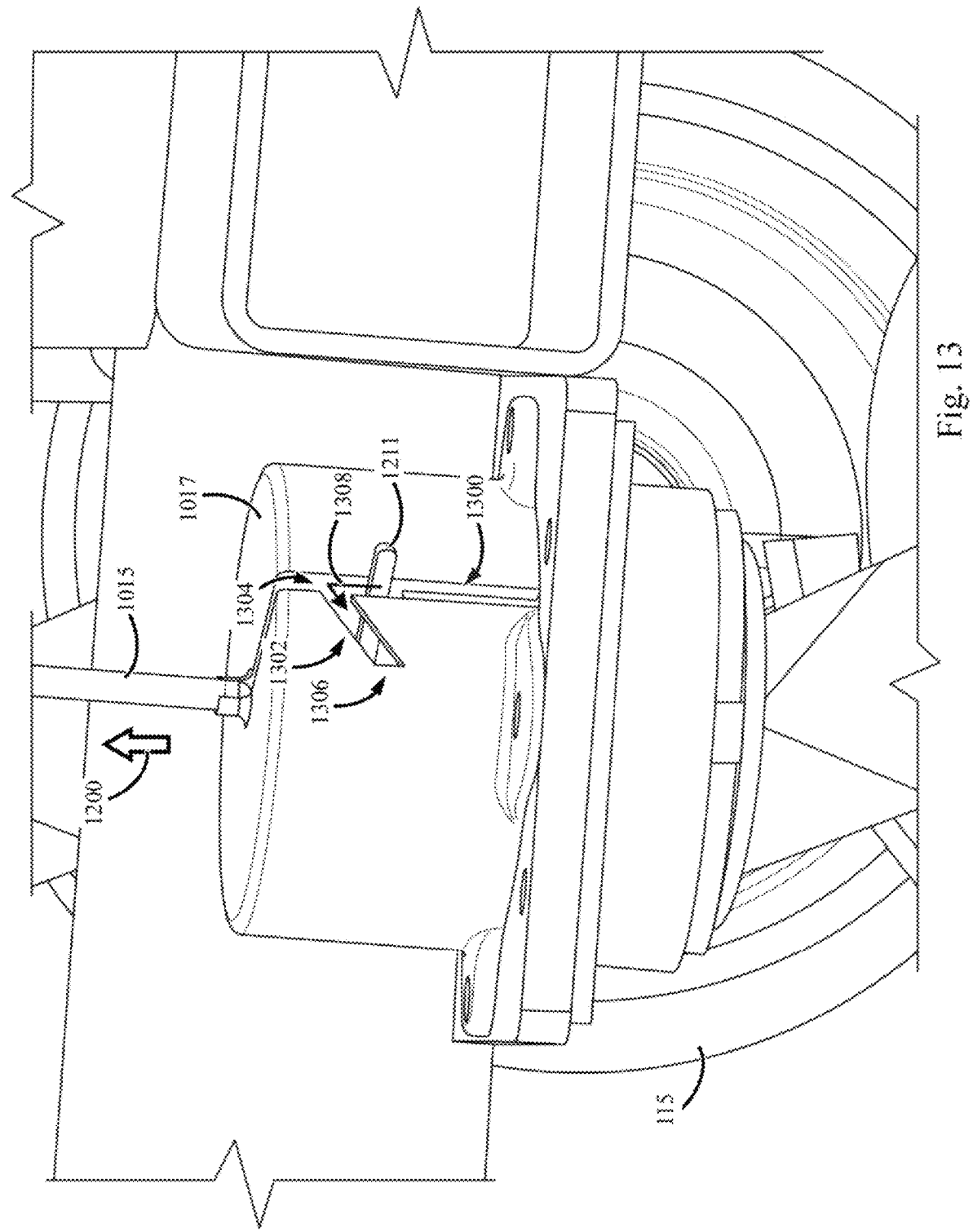
FIG. 13 is a close-up view of a set pin and brake housing for a wheel of a service cart.

FIG. 12 also depicts a set pin 1211 coupled to brake pushrod 1201, which is operable to stabilize the position of brake pad 1209, as part of a pin-and-slot system. FIG. 13 provides an up-close view of the operation of the pin-and-slot system, including the set pin 1211, with respect to brake housing 1017. Set pin 1211 is configured to move within a pin channel 1300 of brake housing 1017. Pin channel 1300 comprises a channel branch 1302 having a proximal end 1304 and a distal end 1306. When force 1200 is applied to brake cable 1015, set pin 1211 moves along pin channel 1300 in direction 1308, eventually passing through proximal end 1304 and towards distal end 1306. When force 1200 relents, the set pin 1211 will be forced by compression spring 1203 (see FIG. 12) in the opposite of direction 1308 toward its original position. The width of pin channel 1300 and channel branch 1302 is calibrated to provide enough space for set pin 1211 to move freely, but only within a specified tolerance in any direction other than direction 1308 or its reverse. The calibrated width of channel 1300 and channel branch 1302 advantageously stabilizes the motion of set pin 1211, providing smooth motion during application of force 1200, and during return of set pin 1211 to its original position. Additionally, the specified width of branch channel 1302 helps to stabilize the motion of set pin 1211 when its displacement passes proximal end 1304, permitting small variations in force 1200 without resulting in reapplication of brake pad 1209 (see FIG. 12) to wheel 115. In the depicted embodiment, channel 1300 comprises an oblique L-shaped channel with channel branch 1302, but other embodiments may comprise other configurations of channel 1300 and channel branch 1302 without deviating from the teachings disclosed herein. Some embodiments may not comprise one or more of set pin 1211, channel 1300, or channel branch 1302 without deviating from the teachings disclosed herein.

Figure 14:
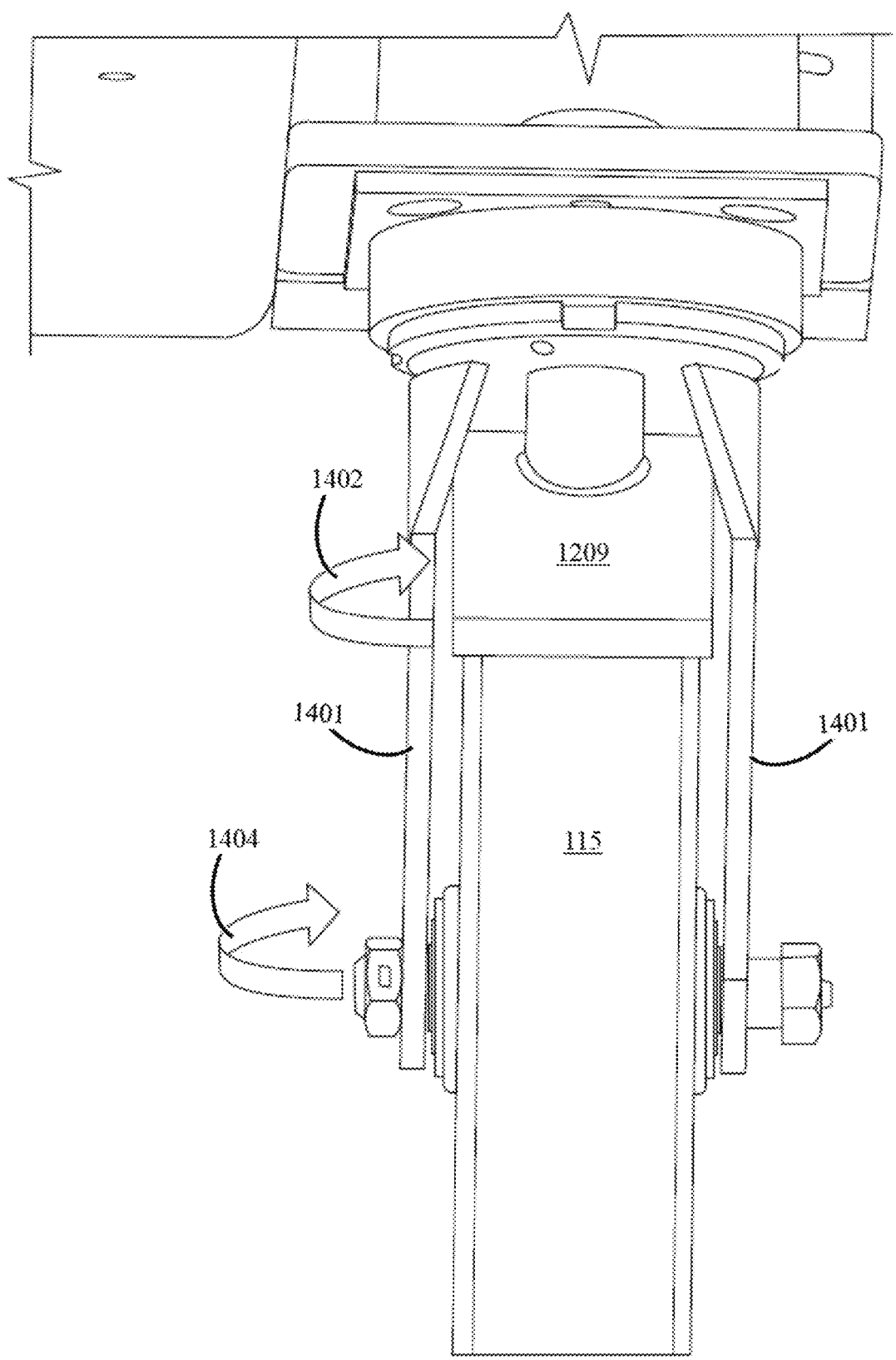
FIG. 14 is a close-up view of a wheel of a service cart having a wheel fork and an associated brake pad.

As noted above with respect to FIG. 12, wheel 115 may swivel about an axis parallel to brake pushrod 1201. Because brake pad 1209 is more efficient when more of its surface makes contact with wheel 115, it would be advantageous for brake pad 1209 to swivel in tandem with wheel 115. Thus, brake pad 1209 may be configured to swivel about the same axis with the same degree of freedom as wheel 115. In the depicted embodiment, brake pad 1209 may comprise 360 degrees of freedom to swivel about this axis, but other embodiments may comprise other configurations without deviating from the teachings disclosed herein. FIG. 14 provides a view of an embodiment of wheel 115 having a number of wheel forks 1401. In the depicted embodiment, wheel forks 1401 are configured to couple to wheel 115 via a bolt at its rotational axle, but other embodiments may comprise other configurations without deviating from the teachings disclosed herein. Wheel forks 1401 are arranged so as to provide a gentle rotation force against brake pad 1209 about its swivel axis whenever wheel 115 swivels about the same access. By way of example, and not limitation, in the depicted embodiment wheel forks 1401 are configured to cause brake pad 1209 to swivel about a rotational direction 1402 whenever wheel 115 swivels about the rotational direction 1404. Notably, rotational directions 1402 and 1404 are parallel about the same rotational axis, and thus brake pad 1209 will swivel such that it is substantially aligned with wheel 115 at any arrangement thereof, optimizing braking force when brake pad 1209 is engaged with wheel 115.

Figure 15:
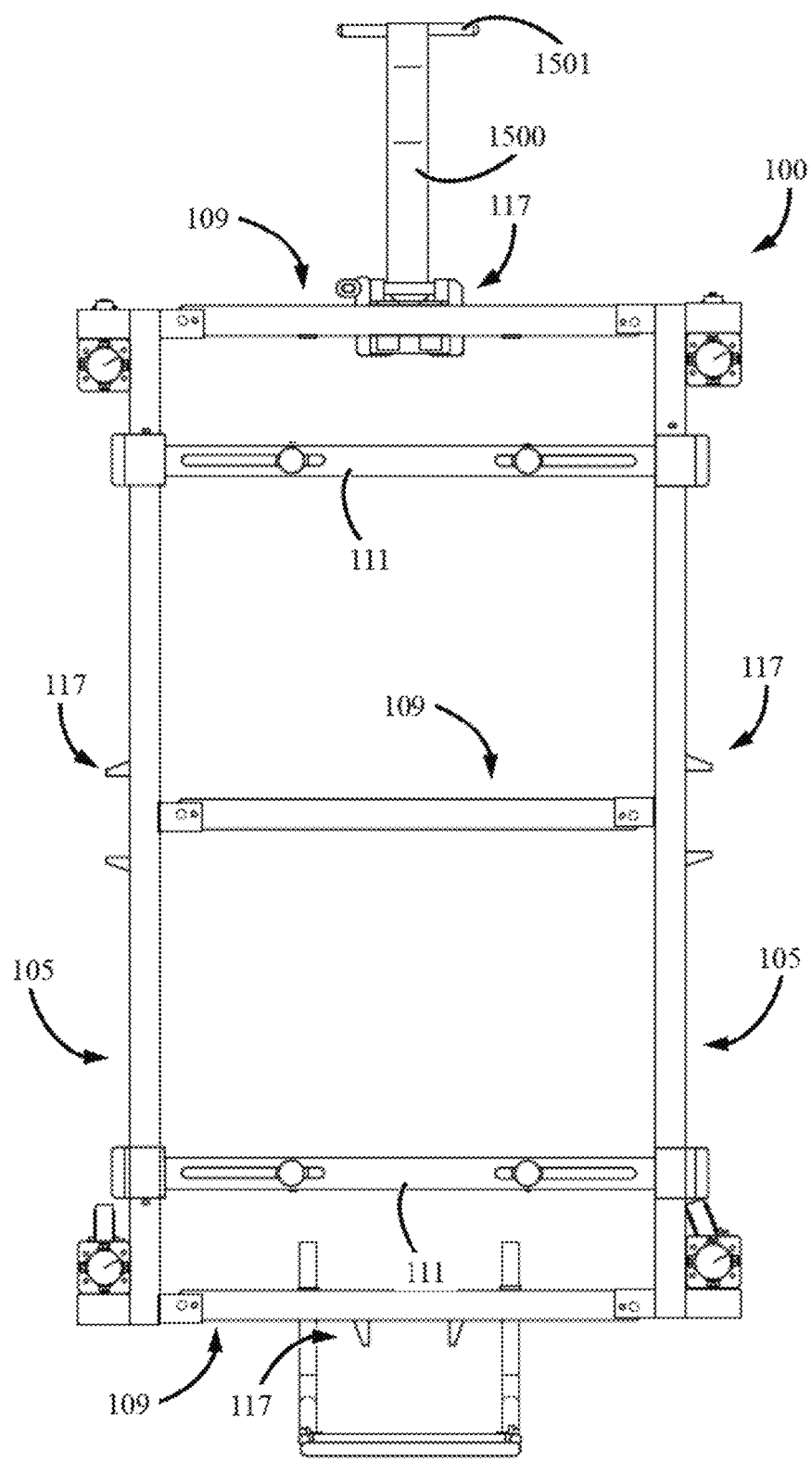
FIG. 15 is an overhead view of a service cart illustrating the placement of a number of tow hitches compatible with an external tow device.

A service cart, when loaded by an electric battery, may comprise a significant amount of weight that is difficult to move. It would therefore be advantageous for a service cart to be configured to receive help from an external tool suitable to reduce the amount of effort needed for a technician to move the full weight of a loaded cart, such as a towing or tugger device. FIG. 15 provides an overhead view of service cart 100, displaying an arrangement of tow hitches 117 around service cart 100 from a different angle than provided above in FIG. 1. As shown above with respect to FIG. 1, FIG. 15 depicts an embodiment wherein each of the plurality of tow hitches 117 are operably disposed upon one of a first set of brace members 105 or a first set of cross members 109, however other embodiments may have different configurations without deviating from the teachings disclosed herein. Other such embodiments may comprise configurations having a different number of tow hitches 117, different arrangements of one or more tow hitches 117, or some combination thereof. FIG. 15 additionally illustrates an overhead view of an external tow device 1500 operably coupled to one of tow hitches 117. In the depicted embodiment, external tow device 1500 comprises a hand-maneuvered electric tow device, but other devices may be utilized without deviating from the teachings disclosed herein. Other such external tow devices may comprise an electric tow device, a hydraulic tow device, a pneumatic tow device, a tow device operating using a combustion engine, or any other similar device powered by a mechanism known to one of ordinary skill in the art without deviating from the teachings disclosed herein. In some configurations, the external tow device may be configured as a "tugger" that is well-suited for applying a pulling force in an orthogonal direction away from the frame of service cart 100, though in the depicted embodiment the external tow device is well-suited to providing such force as well as a pushing force in an orthogonal direction toward service cart 100. External tow device may advantageously be specified to provide sufficient external force to move the cart under load when the brakes of wheels 115 (see FIG. 1) are disengaged. By way of example, and not limitation, external tow device 1500 may be operable to provide an external force sufficient to move loads of at least 1000 pounds, but may additionally be operable to provide external forces sufficient to move loads of at least 3000-5000 pounds without deviating from the teachings disclosed herein.

FIG. 15 also illustrates a tow handle 1501 of external tow device 1500, which a technician may use to apply push/pull forces to the service cart 100 that are magnified by external tow device 1500, as well as to maneuver the external tow device in order to provide such forces in a desired orientation to move service cart 100 in a desired direction. In the depicted embodiment, multiple external tow devices 1500 may be coupled at distinct tow hitches 117, permitting multiple technicians to utilize multiple such devices to move the cart under load. Such an arrangement may advantageously permit a cart subjected to a very heavy load to be moved using external tow devices that are each individually insufficient to move the entire weight of the loaded cart individually, improving safety for the technicians and longevity of the external tow devices. In the depicted embodiment, external tow device is detachably coupled to tow hitch 117, and may be detachably coupled to any of the tow hitches 117 in this embodiment or other embodiments without deviating from the teachings disclosed herein.

Figure 16A:
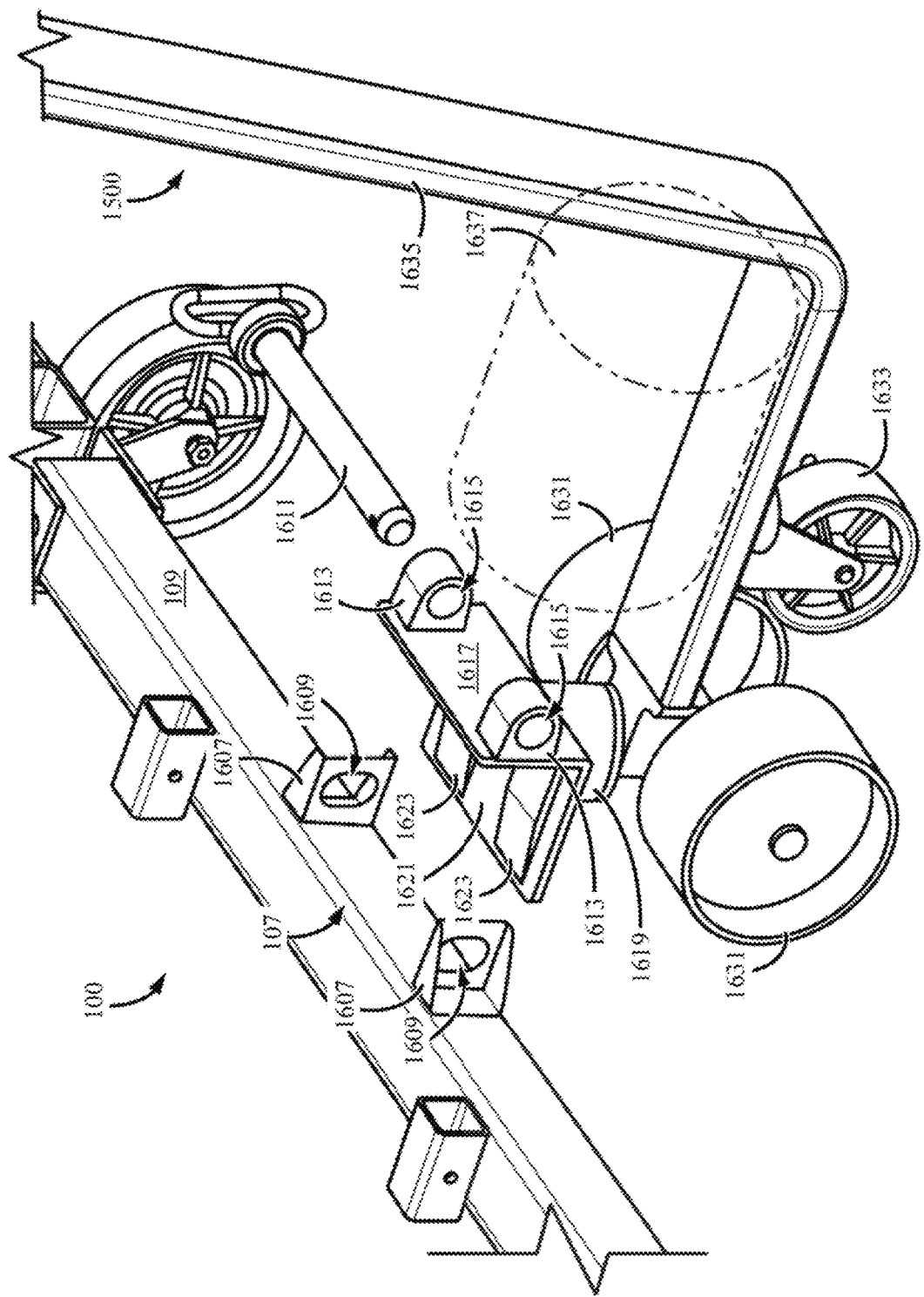
FIG. 16A is a close-up view of the hitching components of a service cart and external tow device prior to coupling.

FIG. 16A comprises a close-up view of the components of tow hitch 117 and external tow device 1500. Tow hitch 117 comprises a pair of hitch flanges 1607 that are used to provide a brace for the hitching components of external tow device 1500. Each of hitch flanges 1607 comprise an elongated hole 1609. The detachable coupling of external tow device 1500 is achieved via a pin coupling using a hitch pin 1611, wherein the elongated holes 1609 are substantially aligned in order to accommodate the hitch pin 1611 being inserted through each of the hitch flanges 1607. During coupling of external tow device 1500 with service cart 100, hitch pin 1611 is additionally inserted through a number of pin receivers 1613 of external tow device 1500, each pin receiver 1613 having a pin hole 1615 configured to receive hitch pin 1611 and substantially aligned to accommodate the insertion of hitch pin 1611 through both during coupling.

Pin receivers 1613 are mounted upon a hitch bracket 1617, having a bracket collar 1619 that operably couples hitch bracket 1617 to the rest of external tow device 1500. Hitch bracket 1617 additionally comprises a receiving face 1621 operable to interface with a member of service cart 100 when external tow device 1500 is coupled to tow hitch 107. In this illustration, the particular member is a cross member 109, but hitch bracket 1617 is also suitable to interface with brace members 105 (see FIG. 1) of service cart 100 without deviating from the teachings disclosed herein.

Receiving face 1621 additionally comprises a number of compression ramps 1623 that are configured to provide cushion and specific friction between receiving face 1621 and cross member 109 or brace member 105 of service cart 100 during coupling. In the depicted embodiment, compression ramps 1623 provide several advantages when coupling service cart 100 with external tow device 1500. In a first advantage, the shape of compression ramps 1623 helps to gradually transfer weight from service cart 100 to external tow device 1500. In a second advantage, the material composition of compression ramps 1623 may be selected to control for friction between the receiving face 1621 and service cart 100 during coupling. By way of example, and not limitation, the compression ramps 1623 in the depicted embodiment may be made of a polymer, but other materials may be utilized in other configurations without deviating from the teachings disclosed herein. The material may be selected such that friction between service cart 100 and receiving face 1621 is minimized during coupling and decoupling, but is still sufficient to produce an effective transfer of force from the external tow device 1500 to the service cart 100 while coupled. In an additional third advantage, such a material selection may minimize scratching or other cosmetic damage to the parts of service cart 100 that come in contact with compression ramps 1623 while increasing cushion and friction compared to a metallic component, such as receiving face 1621.

The increased cushion between receiving face 1621 and compression ramps 1623 advantageously stabilizes the coupling and further protects the cosmetic appearance and structural integrity of service cart 100 and hitch bracket 1617 while also helping to reduce corrosion in both caused by surface defects from frictional interfacing, which advantageously improves the operational lifespan of both service cart 100 and external tow device 1500. Additional aspects of compression ramps 1623 are described below with respect to FIG. 17.

In the depicted embodiment, hitch bracket 1617 comprises the hitching components of external tow device 1500, while bracket collar 1617 couples the hitch bracket 1617 to the drive components of the external tow device. The drive components include a number of simple wheels 1631 operable to provide a rolling force in a direction tangent to their rotation. External tow device 1500 also comprises a rudder wheel 1633 operable to permit a technician to steer the external tow device 1500. Rudder wheel 1633 is a caster wheel operable to swivel and provide pivot adjustments in response to pivot forces applied by a technician to tow handle 1501 (not shown, see FIG. 15). In combination, simple wheels 1631 and rudder wheel 1633 are operable to allow a user to maneuver both external tow device 1500, and service cart 100 (when coupled thereto) by applying push and pulling forces at various angles with respect to an axis defined by hitch pin 1611 when coupled. These forces are transferred from tow handle 1501 to the wheels via a handle stem 1635.

Figure 16B:
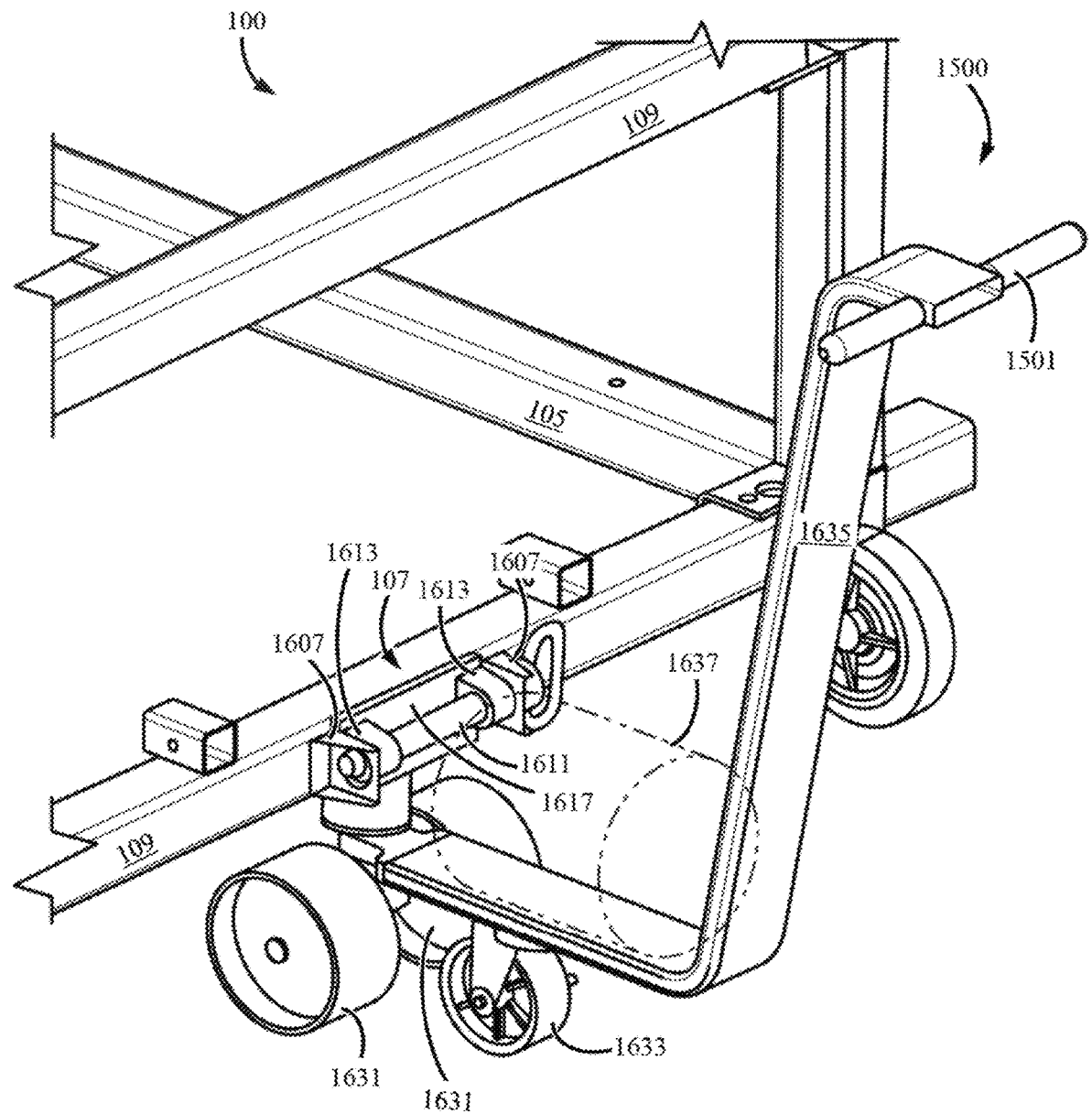
FIG. 16B is a close-up view of an external tow device detachably coupled to a service cart using the hitching components of each.

FIG. 16B is an illustration of external tow device 1500 during an active coupling with tow hitch 117. In the depicted embodiment, hitch pin 1611 is inserted through all of hitch flanges 1607 and pin receivers 1613, and compression ramps 1623 (not shown) have interfaced with the underside of cross member 109. The depicted coupling is a detachable coupling, and hitch pin 1611 may be removed at any time to detach external tow device 1500 from tow hitch 117, permitting compression ramps 1623 to disengage from the underside of cross member 109 as the external tow device 1500 is pulled away from the frame of service cart 100.

It is additionally noted that external tow device 1500 comprises a prime mover 1637 suitable to apply rotational forces to simple wheels 1631 in response to pull or push forces applied via tow handle 1501. In the depicted embodiment, prime mover 1637 is arranged within an L-curve of handle stem 1635, but other embodiments may comprise other arrangements without deviating from the teachings disclosed herein. In the depicted embodiment, prime mover 1637 is depicted transparently so as to avoid occlusion of other components of external tow device 1500. In the depicted embodiment, prime mover 1637 may comprise an electric motor, but other embodiments may comprise other configurations without deviating from the teachings disclosed herein. Other such external embodiments may comprise an a hydraulic system, a pneumatic system, a combustion motor, a hybrid motor, or any other similar device powered by a mechanism known to one of ordinary skill in the art without deviating from the teachings disclosed herein. In the depicted embodiment, external tow device 1500 may provide enough force to move a service cart weighing more than 1000 pounds when under load. In some embodiments, external tow device 1500 may provide enough force to move a service cart weighing 3000-5000 pounds when under load without deviating from the teachings disclosed herein.

Figure 17A:
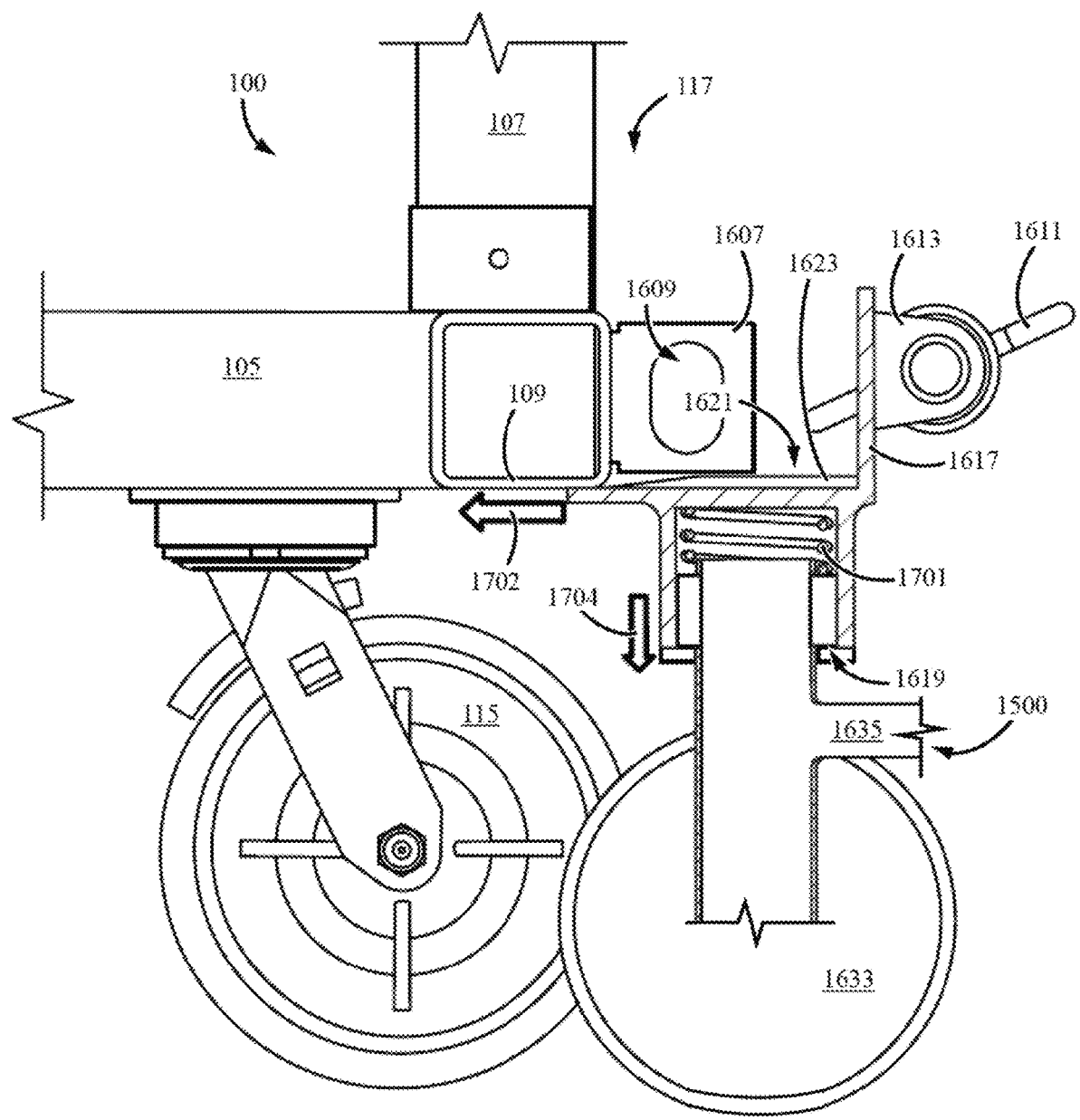
FIG. 17A is a cross-sectional view of the hitching components of a service cart and external tow device prior to coupling.
Figure 17B:
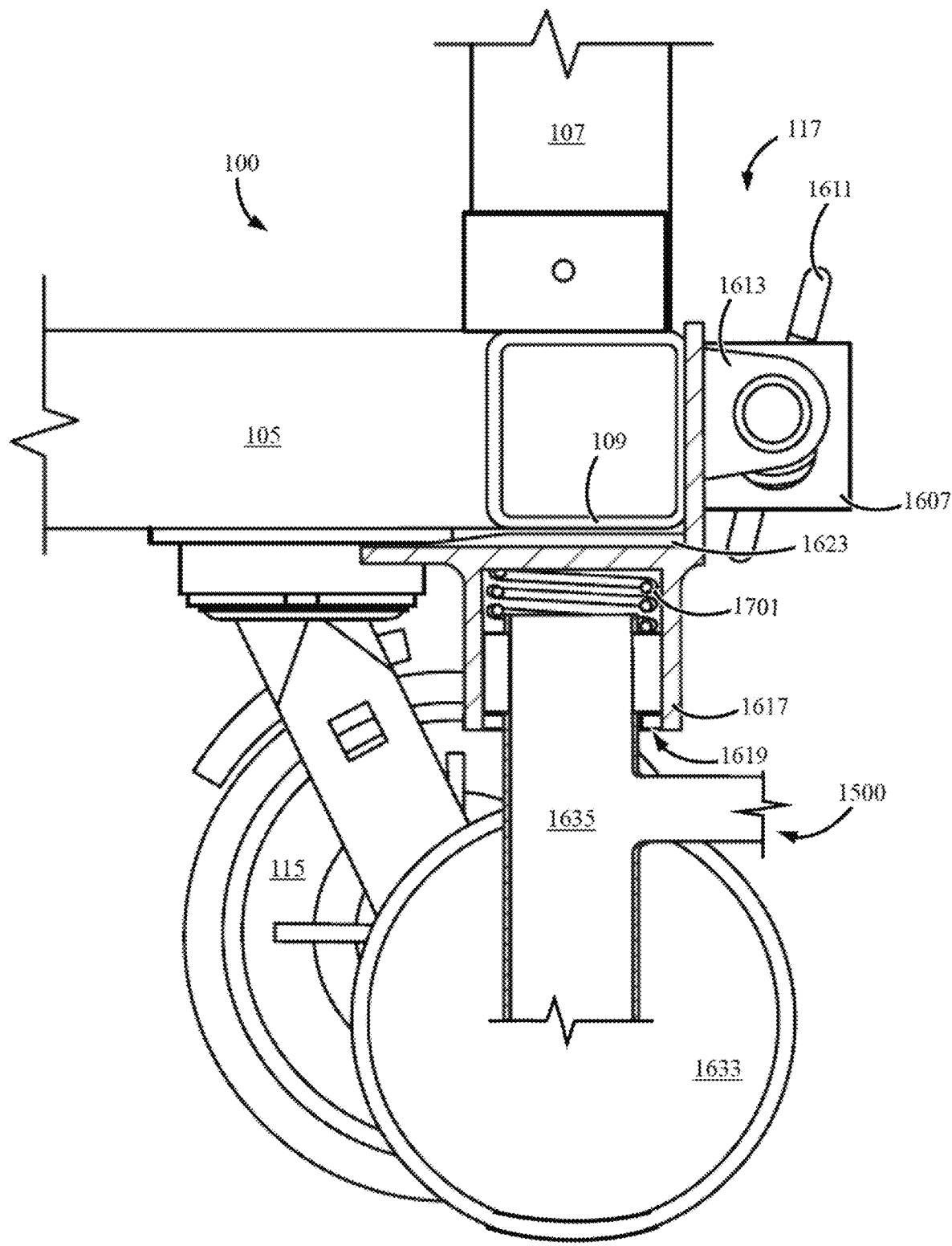
FIG. 17B is a cross-sectional view of the hitching components of a service cart and external tow device when coupled.

FIG. 17A and FIG. 17B provide cross-sectional views of portions of service cart 100 and portions of external tow device 1500 at a plane bisecting tow hitch 117 at an even distance between each of hitch flanges 1607. The depicted plane also bisects external tow device 1500 at an even distance between each of simple wheels 1633. FIG. 17A provides an illustration of the two devices just prior to coupling, and FIG. 17B provides an illustration of the two devices when coupled.

In FIG. 17A, handle stem 1635 extends upward into bracket collar 1619 of hitch bracket 1617, permitting hitch bracket 1617 to swivel about an axis defined by the longitudinal center of the extension. Within bracket collar 1619, a compression spring 1701 provides normal upward force and the underside of receiving face 1621, forcing upward compression ramps 1623. The normal upward force of compression spring 1701 advantageously permits a lower minimal coefficient of friction between compression ramps 1623 and service cart 100 along direction 1702, easing the coupling and decoupling processes while maintaining a base level of traction between them when coupled. As external tow device 1500 is moved along direction 1702 engage the coupling, the weight of service cart 100 is received by compression ramps 1623, generating a downward force 1704 against the normal upward force of compression spring 1701.

In FIG. 17B, hitch pin 1611 is inserted into each of hitch flanges 1607 and pin receivers 1613, while the underside of cross member 109 transfers some of the weight of service cart 100 onto compression ramps 1623, compressing the compression spring 1701 to some degree, and increasing the stability of the pin mounting mechanism via friction between the compression ramps 1623 and cross member 109. Though compression spring 1701 is compressed in this depiction, it is noted that hitch bracket 1617 may still swivel about the axis of the extension of handle stem 1635, permitting a technician to adjust the angle with which pushing or pulling force is applied to the service cart 100 with respect to the coupled external tow device 1500. As shown above with respect to FIG. 16, this coupling is a detachable coupling, and hitch pin 1611 may be removed at any time to permit a separation of external tow device 1500 from service cart 100.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A service cart comprising:
    a frame comprising a number of first brace members, a number of second brace members, a number of support members, a number of first cross members and a number of second cross members, wherein each of the support members are disposed between a first brace member and a second brace member, each of the first cross members are disposed between ones of the number of first brace members, and each of the second cross members are disposed between ones of the number of second brace members;
    a number of wheels, each of the wheels operably coupled to at least one of the first brace members or one of the first cross members;
    a number of brake housings having a brake, each of the brake housings operably coupled to one of the number of wheels and configured to apply a braking force to its respective wheel when its brake is engaged;
    a handle mount coupled to a first brace member of a first cross member; and
    a handle configured to be detachably coupled to the handle mount,
    wherein the first cross members comprise a locking hinge and a number of the second cross members are folding second cross members that comprise a locking hinge, the first cross members and folding second cross members each being operable to adjust its respective coupling angles to its respective brace members when the locking hinge is disengaged, and wherein each of the brake housings are disengaged via a control in the handle.

2. The service cart of claim 1, wherein the frame comprises two first brace members, two second brace members, six support members, three first cross members, and at least three second cross members.

3. The service cart of claim 1, wherein at least one of the locking hinges comprises a spring-loaded pin lock.

4. The service cart of claim 1, wherein the frame may be configured into a compact form wherein each of the first cross members and the folding cross members are arranged such that their respective coupling angles are each a desired minimum angle.

5. The service cart of claim 4, wherein the desired minimum angle is 0 degrees.

6. The service cart of claim 1, wherein each of the locking hinges have a motion range of at least 45 degrees.

7. The service cart of claim 4, wherein each of the locking hinges have a motion range of at least 85 degrees.

8. The service cart of claim 7, wherein each of the locking hinges have a motion range of at least 90 degrees.

9. The service cart of claim 1, wherein the frame is specified to support a load of at least 3,000 pounds.

10. The service cart of claim 9, wherein the flame is specified to support a load of at least 5,000 pounds.

11. The service cart of claim 1, wherein the service cart wherein the handle comprises a pushrod and the brakes are selectively engaged according to the position of the pushrod.

12. The service cart of claim 11, wherein each of the brakes comprises a normally-engaged configuration.

13. The service cart of claim 1, further comprising a tow hitch disposed upon the frame, the tow hitch operable to detachably couple the frame to an external towing device having a hitch bracket by coupling the tow hitch and the hitch bracket.

14. The service cart of claim 1, wherein at least one of the second cross members is an adjustable cross member configured to be adjustably disposed between two of the second brace members lengthwise at an orthogonal angle to each of the second brace members and wherein each of the adjustable cross members comprises a support pad configured to provide a support force in a direction substantially parallel to the lengthwise orientation of the support members.

15. The service cart of claim 14, wherein each of the support pads is configured to be adjustably disposed lengthwise with respect to its respective second cross member.

16. The service cart of claim 1, wherein at least one of the second cross members comprises a support pad configured to provide a support force in a direction substantially parallel to the lengthwise orientation of the support members, the support pad having a stem collar with a collar opening configured to receive a break pin, the break pin configured to be inserted into the collar opening and to break when subjected to an excessive shearing force.

17. The service cart of claim 16, wherein the break pin is configured to generate an audible signal when breaking.

18. The service cart of claim 1, wherein the locking hinge comprises a spring-loaded pin lock.

* * * * *